United States Patent
Brown et al.

(10) Patent No.: US 8,276,895 B2
(45) Date of Patent: Oct. 2, 2012

(54) CLAMPING DEVICE

(75) Inventors: Warren Brown, Mount Evelyn (AU); Graham Gerhardt, Warrandyte (AU); Harry Szommer, Carrum Downs (AU); Guojun Chen, Suzhou (CN); Quangang Liu, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 1027 days.

(21) Appl. No.: 12/058,016

(22) Filed: Mar. 28, 2008

(65) Prior Publication Data

US 2009/0121405 A1      May 14, 2009

(51) Int. Cl.
B25B 1/20   (2006.01)
B25B 1/02   (2006.01)
B25B 5/02   (2006.01)
B26D 5/08   (2006.01)
B25B 1/06   (2006.01)

(52) U.S. Cl. .............. 269/45; 269/210; 83/581

(58) Field of Classification Search ............ 269/45, 269/88, 79, 158, 159, 166–171.5, 208, 210, 269/212–216, 901.6; 108/167, 171, 187, 108/121, 122, 123; 83/435.27, 581, 651
See application file for complete search history.

(56) References Cited

U.S. PATENT DOCUMENTS

| | | | | |
|---|---|---|---|---|
| 281,463 A * | 7/1883 | Coram | | 269/201 |
| 1,256,217 A * | 2/1918 | Fieldhoure | | 269/266 |
| 2,892,369 A * | 6/1959 | Millet | | 269/210 |
| 3,460,226 A * | 8/1969 | Hildebrand | | 72/476 |
| 3,580,459 A * | 5/1971 | Gage et al. | | 228/2.3 |
| 4,057,239 A * | 11/1977 | Hopf et al. | | 269/170 |
| 5,145,157 A * | 9/1992 | Polk | | 269/266 |
| 5,518,053 A * | 5/1996 | Robison | | 144/286.1 |
| 5,524,872 A * | 6/1996 | Lewin et al. | | 269/210 |
| 5,592,981 A * | 1/1997 | Derecktor | | 144/286.1 |
| 5,746,423 A * | 5/1998 | Arov | | 269/266 |
| 5,884,681 A * | 3/1999 | Nickles | | 144/329 |
| 6,079,931 A * | 6/2000 | English et al. | | 414/458 |
| 6,299,152 B1* | 10/2001 | Sangmeister et al. | | 269/139 |
| 6,471,220 B1 | 10/2002 | Babb | | |
| 6,644,158 B2* | 11/2003 | Cleave et al. | | 83/455 |
| 6,688,202 B2* | 2/2004 | Parks et al. | | 83/435.27 |
| 6,745,804 B2* | 6/2004 | Welsh et al. | | 144/287 |
| 6,942,229 B2* | 9/2005 | Brazell et al. | | 280/30 |
| 7,036,540 B2* | 5/2006 | Welsh et al. | | 144/286.1 |
| 7,210,510 B2* | 5/2007 | Barclay deTolly | | 144/286.1 |

(Continued)

FOREIGN PATENT DOCUMENTS

| | | |
|---|---|---|
| CN | 1 736 664 A | 2/2006 |
| EP | 1 410 881 A2 | 4/2004 |
| WO | WO 2004/050309 A1 | 6/2004 |

OTHER PUBLICATIONS

European Search Report, mailed Jan. 29, 2009, 7 pgs.

*Primary Examiner* — Lee D Wilson
*Assistant Examiner* — Alvin Grant
(74) *Attorney, Agent, or Firm* — John R. Thompson; Stoel Rives LLP

(57) ABSTRACT

The present invention relates to a clamping device comprising an elongate support structure carrying a fixed jaw and a movable jaw and an advancing clamping mechanism mounted on the support structure for advancing the movable jaw toward the fixed jaw in a longitudinal direction. The clamping device further comprises a transportation mechanism for convenient transportation.

8 Claims, 27 Drawing Sheets

U.S. PATENT DOCUMENTS

| | | | |
|---|---|---|---|
| 7,458,403 B2 * | 12/2008 | Radermacher | 144/286.1 |
| 7,603,935 B2 * | 10/2009 | Howe | 83/452 |
| 7,647,956 B1 * | 1/2010 | Cona et al. | 144/286.5 |
| 7,798,478 B2 * | 9/2010 | Janson et al. | 269/6 |
| 7,814,947 B2 * | 10/2010 | Ayala et al. | 144/286.1 |
| 7,878,276 B2 * | 2/2011 | Limbacher, Jr. | 180/8.1 |
| 2004/0154449 A1 * | 8/2004 | Parks et al. | 83/477.2 |
| 2004/0250903 A1 * | 12/2004 | Welsh | 144/286.5 |
| 2009/0151816 A1 * | 6/2009 | Billings et al. | 144/287 |

* cited by examiner

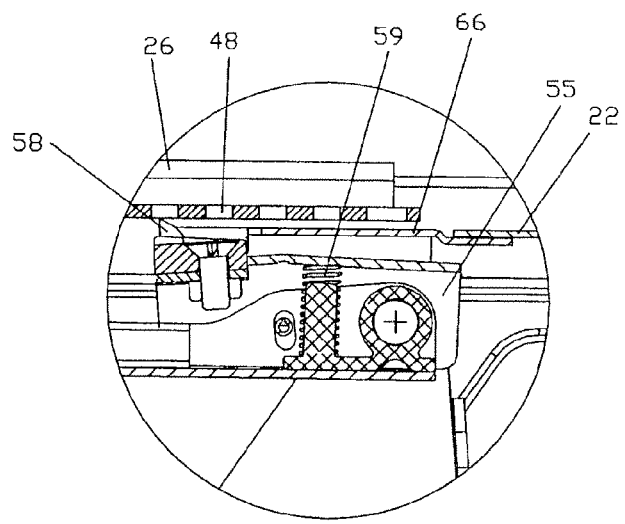
FIG. 3
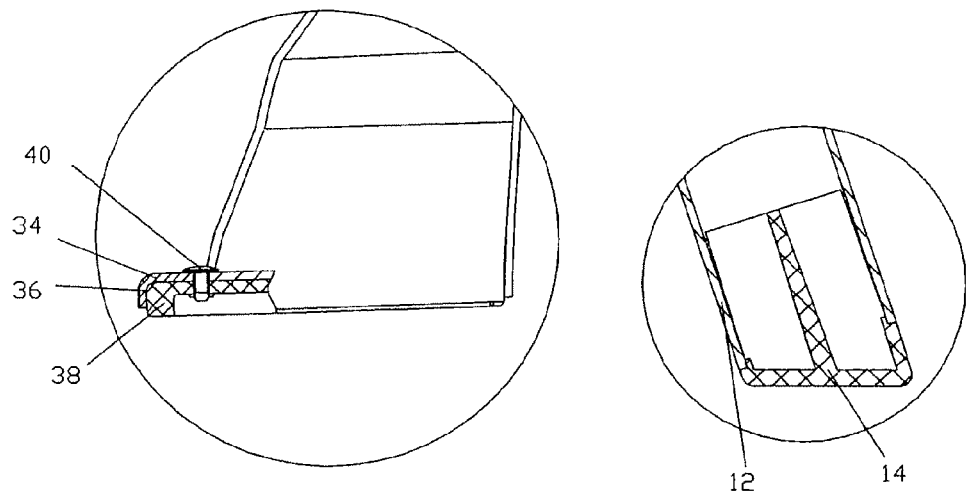
FIG. 4
FIG. 5

E-E

H-H

CLAMPING DEVICE

FIELD OF THE INVENTION

The present invention relates to a clamping device such as a vice for clamping a workpiece between a pair of clamping jaws at a safe and comfortable height.

BACKGROUND OF THE INVENTION

The most common clamping device in current use is a vice having a fixed jaw and a moving jaw carried by a threaded support engaged by a correspondingly threaded shaft for advancing the moving jaw to clamp a workpiece between the fixed and moving jaw.

U.S. Pat. No. 5,524,872 describes a clamping device which comprises a support structure carrying two adjustably spaced apart jaws, a lever mechanism pivotally mounted on the support structure and an operably engaging advancing mechanism for moving one of the jaws relative to the other as the lever mechanism is pivoted to a selected position to apply a selected clamping force to an object between the jaws determined by the force applied to the lever. A locking mechanism holds the two jaws in a selected position with the selected clamping force applied to the object. The locking mechanism allows the continuous and infinitely variable locking of the clamping device in a selected position. However the clamping device is made from machined cast steel and is very heavy. For this reason, the clamping device is inconvenient for long distance transportation.

GB-A-2369314 describes a bench vice with pivotal jaw adaptors. CN100339185C discloses a rapid clamping rabbet holder. U.S. Pat. No. 6,471,220 discloses a combined cart and stand comprising a base for supporting a power driven threading machine and having a pair of wheels for supporting the base and machine for rolling movement along an underlying surface.

Since its jaws provide only a two-point contact with a workpiece, a commonplace vice is unsatisfactory for clamping logs, tubes or other items with a non-planar profile. Furthermore the length of the jaws is greater than that of a chainsaw bar so that the clamping device is unable to clamp a chainsaw bar for sharpening. If required, a special clamping device must be used to sharpen the chainsaw bar which is inconvenient.

The common clamping device has only one clamping area which is formed by the two jaws. For welding, a welding member and a member to be welded are required to be clamped simultaneously in a desired position such that two clamping areas are required. For this reason, the common clamping device is unsatisfactory for welding.

OBJECTS OF THE INVENTION

It is an object of a first aspect of the present invention to provide a clamping device which is convenient for transportation.

It is an object of a second aspect of the present invention to provide a clamping device having a first and second clamping portion, wherein the first and second clamping portion is capable of performing alternate working.

It is an object of a third aspect of the present invention to provide a clamping device having two clamping areas.

STATEMENT OF THE INVENTION

According to a first aspect the present invention provides a clamping device comprising:
  a fixed jaw;
  an elongate support structure having a proximal end and a distal end, wherein the elongate support structure carries the fixed jaw at or near to its proximal end;
  a surface-bearing foldable frame attached to and supporting the elongate support structure;
  an elongate fixed track having a proximal end and a distal end, wherein the elongate fixed track is immovably mounted on the support structure;
  a movable jaw;
  a sliding track movably mounted on the fixed track, wherein the sliding track carries the movable jaw;
  an advancing clamping mechanism mounted on the support structure for advancing the sliding track along the fixed track towards the fixed jaw in a longitudinal direction; and
  a transportation mechanism attached to at least one of the proximal end of the elongate support structure and the fixed jaw, wherein the transportation mechanism in use facilitates surface-bearing transportation of the clamping device.

The surface-bearing foldable frame may be ground-bearing. The transportation mechanism in use typically facilitates (eg promotes) ground-bearing transportation of the clamping device.

The fixed jaw may be mounted on a proximal end of the fixed track.

The fixed track may be a pair of fixed tracks which may be substantially parallel and spaced apart.

The sliding track may carry the movable jaw at or near to its proximal end. The movable jaw may be capable of moving towards the fixed jaw along the sliding track to effect clamping.

The sliding track may be slidably mounted on the fixed track.

The transportation mechanism may be rollable or slidable on the surface.

In a preferred embodiment, the transportation mechanism comprises:
  a rotatable shaft mounted on the proximal end of the elongate support structure,
  a wheel mounted on the rotatable shaft, wherein the rotatable shaft is substantially perpendicular to the longitudinal direction of the sliding track.

Particularly preferably a length of the wheel in a transverse direction is greater than the diameter of the wheel.

Typically the wheel in use is ground-bearing. Preferably the wheel is ground-bearing in use by elevating the distal end of the elongate support structure.

In a preferred embodiment, the transportation mechanism comprises:
  a rotatable shaft mounted on the fixed jaw, wherein the rotatable shaft is substantially perpendicular to the longitudinal direction of the sliding track;
  a wheel mounted on the rotatable shaft, wherein the rotatable shaft is substantially perpendicular to the longitudinal direction of the sliding track.

Typically the wheel in use is ground-bearing. Preferably the wheel is ground-bearing in use by elevating the distal end of the elongate support structure.

In a preferred embodiment, the transportation mechanism comprises:
  a sliding member disposed at the proximal end of the elongate support structure.

Typically the sliding member in use is ground-bearing. Preferably the sliding member is ground-bearing in use by elevating the distal end of the elongate support structure.

The sliding member may be two sliding members substantially symmetrically spaced apart at the proximal end of the elongate support structure.

Preferably the foldable frame includes:
a first leg disposed at (or near to) the proximal end of the elongate support structure;
a second leg disposed at (or near to) the proximal end of the elongate support structure; and
a third leg disposed at (or near to) the distal end of the elongate support structure.

Particularly preferably the first, second and third legs are pivotally mounted on the support structure about a first, second and third axis respectively and wherein the first and second legs are capable of pivoting inwardly of the elongate support structure and the third leg is capable of pivoting inwardly or outwardly of the elongate support structure.

The first, second and third leg are typically divergent away from the elongate support structure. The third leg is preferably elevational whereby to incline the elongate support structure and render the transportation mechanism ground-bearing.

Particularly preferably the foldable frame has a first, second and third position, wherein in the first position, the first, second and third legs together support the elongate support structure and wherein in the second position, the first, second and third legs are folded for storage and wherein in the third position, the first and second legs are folded for storage and the third leg is folded rearwardly to provide a transportation handle. Preferably in the third position when the transportation mechanism engages the surface, the elongate support structure is inclined relative to the surface by lifting the third leg (eg the transportation handle).

Preferably the clamping device further comprises:
a detent locking mechanism disposed between one of the first leg or the second leg and the elongate support structure, wherein the detent locking mechanism includes:
 a detent member pivotally mounted on the elongate support structure,
 a spring located between the detent member and the elongate support structure,
wherein the detent member provides a first abutment member which in a non-folded position is engaged with the leg and a second abutment member which in a folded position is engaged with the leg.

Typically the first abutment member is a surface of the detent member. Typically the second abutment surface is a pin.

Particularly preferably the clamping device further comprises:
a retaining mechanism disposed between the third leg and the support structure, wherein the retaining mechanism includes
 a screw extending through the third leg and the elongate support structure; and
 a nut engaged with the screw.

In a preferred embodiment, the advancing clamping mechanism includes:
a lever pivotally mounted at its distal end on the elongate support structure;
a foot pedal pivotally mounted on the proximal end of the lever;
an elongate advancing member with pawls pivotally mounted on the distal end of the lever;
an oriented arm slidably connected to the support structure;
a spring disposed between the advancing member and the oriented arm; and
a plurality of apertures in the sliding track engageable with the pawls.

The pawls may be stepwise engageable with the plurality of apertures. The pawls may be biased into engagement with the apertures. For example, the pawls may be spring-biased. The foot pedal may be foot-actuated to cause the lever to pivot. The lever and oriented arm may cause the advancing member to move in a proximal direction whereby pawls are biased to engage the apertures as the sliding track and movable jaw move towards the fixed jaw. When the foot pedal is released, the lever and the foot pedal may retract to their rest position under the action of the spring and the advancing member may be retracted to disengage the pawls from the apertures.

The transportation mechanism is typically disposed at the heavier end of the clamping device so that its centre of gravity is located at a position adjacent to the transportation mechanism to ensure stable transportation. Furthermore the elongate support structure may be inclinable relative to the surface by lifting the third leg for straightforward transportation.

Preferably the clamping device further comprises:
 a first clamping unit attached to the fixed and movable jaw for holding a first workpiece; and
 a second clamping unit for holding a second workpiece in any desired position.

The clamping device in this embodiment has two clamping areas for easy operation.

The second clamping unit may be attached to the sliding track.

The second clamping unit may include a bracket attached to the sliding track, a clamping mechanism for holding the second workpiece and a coupling mechanism for coupling the clamping mechanism to the bracket so that the clamping mechanism can selectively hold the workpiece in a desired position.

The second clamping unit may be fixed to the support structure or the fixed jaw.

Viewed from a further aspect the present invention provides a clamping device comprising:
 a fixed jaw;
 an elongate support structure having a proximal end and a distal end, wherein the elongate support structure carries the fixed jaw at or near to its proximal end;
 a surface-bearing foldable frame attached to and supporting the elongate support structure;
 an elongate fixed track having a proximal end and a distal end, wherein the elongate fixed track is immovably mounted on the support structure;
 a movable jaw;
 a sliding track movably mounted on the fixed track, wherein the sliding track carries the movable jaw;
 an advancing clamping mechanism mounted on the support structure for advancing the sliding track along the fixed track towards the fixed jaw in a longitudinal direction; and
 a transportation mechanism including a rotatable shaft and a wheel mounted on the rotatable shaft, wherein said rotatable shaft is substantially perpendicular to the sliding direction of said sliding track.

Viewed from a yet further aspect the present invention provides a clamping device comprising:
 a fixed jaw;
 an elongate support structure having a proximal end and a distal end, wherein the elongate support structure carries the fixed jaw at or near to its proximal end;

an elongate fixed track having a proximal end and a distal end, wherein the elongate fixed track is immovably mounted on the support structure;

a movable jaw;

a sliding track movably mounted on the fixed track;

an advancing clamping mechanism mounted on the support structure for advancing the sliding track along the fixed track towards the fixed jaw in a longitudinal direction;

a first clamping unit attached to the fixed and movable jaw for holding workpieces; and a second clamping unit for holding a workpiece in any desired position.

Viewed from a yet further aspect the present invention provides a support structure carrying a fixed jaw and a movable jaw, said support structure having a forward end and a rearward end, a fixed jaw disposed at said forward end, a foldable frame attached to said support structure, a fixed track immovably associated with said support structure, a sliding track movably attached to said fixed track, an advancing clamping mechanism mounted on said support structure for advancing said sliding track toward said fixed jaw in a longitudinal direction, a transportation mechanism attached to at least one of said forward end and said fixed jaw.

Viewed from a still yet further aspect the present invention provides a clamping device comprising:

a support structure carrying a fixed jaw and a movable jaw, an advancing clamping mechanism mounted on said support structure for advancing said movable jaw toward said fixed jaw in a longitudinal direction, a fixed vice and a movable vice respectively attached to said fixed jaw and said movable jaw, each of said vices having a base, a first clamping block and a second clamping block respectively connected with the base, at least one of the clamping blocks movably connected with said base for the first and the second clamping blocks being capable of performing alternate working.

Viewed from an even still yet further aspect the present invention provides clamping device comprising:

a support structure carrying a fixed jaw and a movable jaw, said support structure having a forward end and a rearward end, a fixed jaw disposed at said forward end, a foldable frame attached to said support structure, a fixed track immovably associated with said support structure, a sliding track movably attached to said fixed track, an advancing clamping mechanism mounted on said support structure for advancing said sliding track toward said fixed jaw in a longitudinal direction, a first clamping unit attached to the fixed and movable jaw for holding workpieces, said clamping device further comprising a second clamping unit for holing workpieces in any desired position.

BRIEF DESCRIPTION OF THE DRAWINGS

The invention will now be described in a non-limitative sense with reference to the accompanying Figures in which:

FIG. 3 is a section blown-up view according to the indicator A in FIG. 2;

FIG. 4 is an enlarged view according to the indicator B in FIG. 2;

FIG. 5 is an enlarged view according to the indicator C in FIG. 2;

FIG. 10c is an enlarged view according to the indicator M in FIG. 10a;

DETAILED DESCRIPTION OF THE INVENTION

Figure 1:
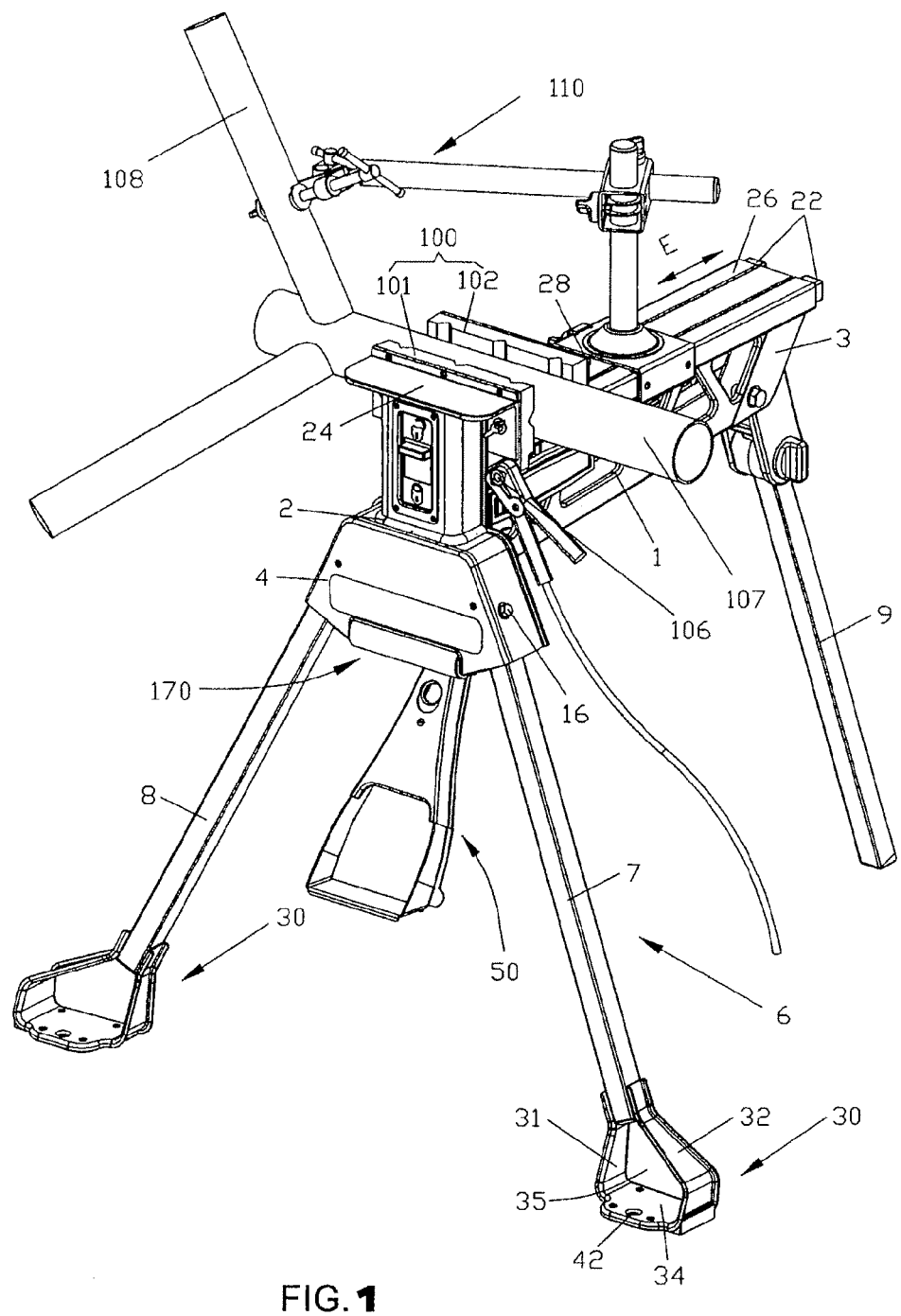
FIG. 1 is a perspective view of a first embodiment of the clamping device of the present invention with a welding station.

As shown in FIG. 1, a first embodiment of the clamping device of the present invention includes an elongate support structure 1 with a proximal end 2 and a distal end 3 supported by a floor-bearing foldable frame 6, a pair of substantially parallel elongate fixed tracks 22 respectively mounted on a first and second side of the support structure 1 and a sliding track 26 which is slidable in a longitudinal direction (E) on the fixed tracks 22. A front board 4 is formed at the proximal end 2. A fixed jaw 24 is mounted on a proximal end of the fixed tracks 22. An advancing clamping mechanism 50 is mounted on the support structure 1 for advancing the sliding track 26 towards the fixed jaw 24. A movable jaw 28 is connected to the proximal end of the sliding track 26. The movable jaw 28 is capable of moving towards the fixed jaw 24 along the sliding track 26 to effect clamping.

Figure 7:
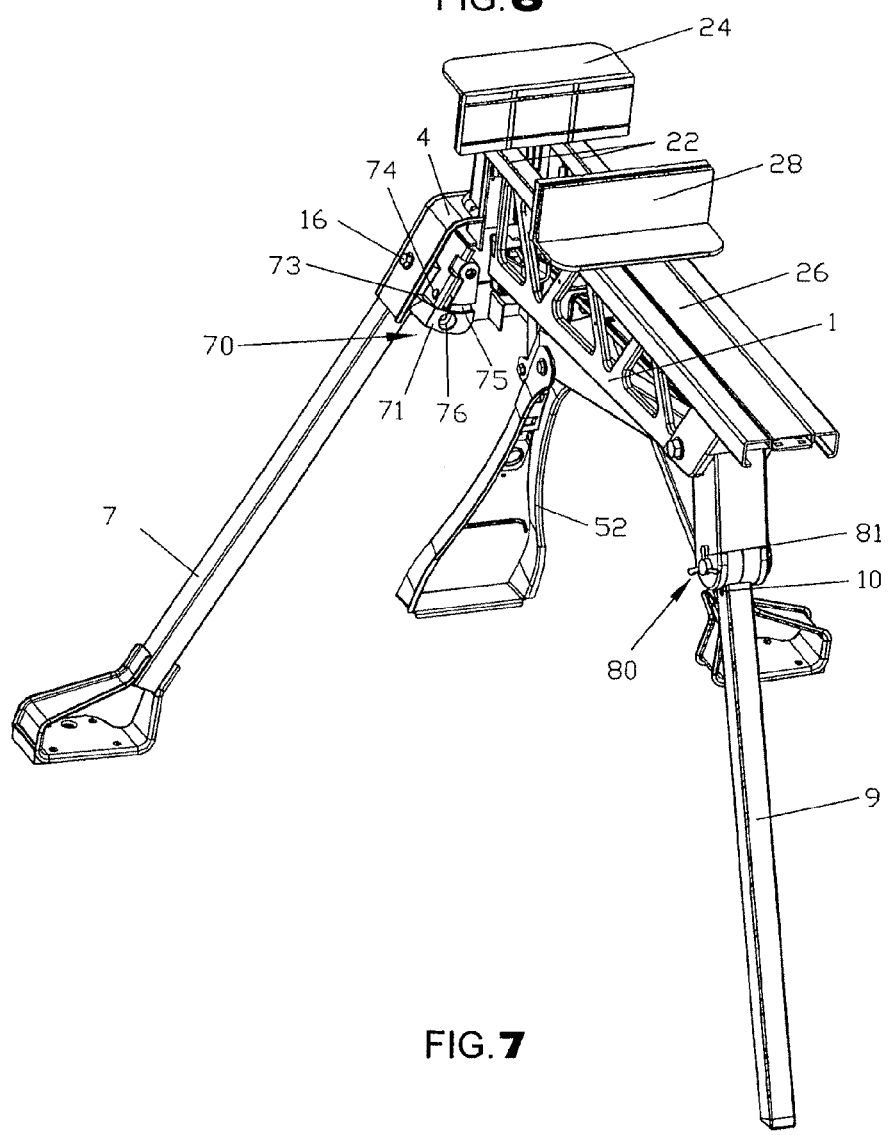
FIG. 7 is a perspective view of the first embodiment of the clamping device of the present invention without the cover.

As shown in FIGS. 1 and 7, the support structure 1 is not a solid construction. It includes two transverse side boards which define a number of equilateral triangular formations to provide increased overall strength whilst minimising weight.

Figure 6:
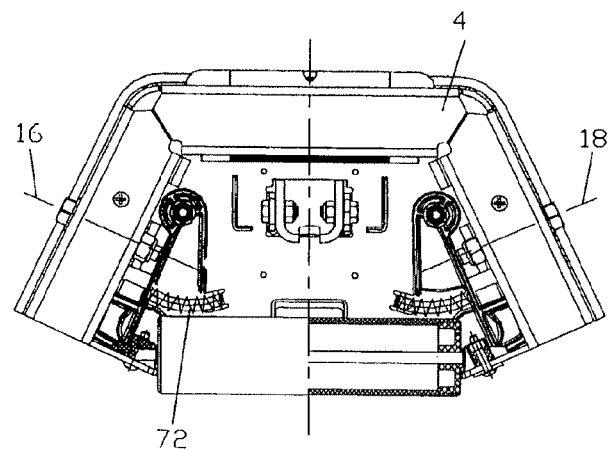
FIG. 6 is a partial schematic view according to the indicator D in FIG. 2.
Figure 16:
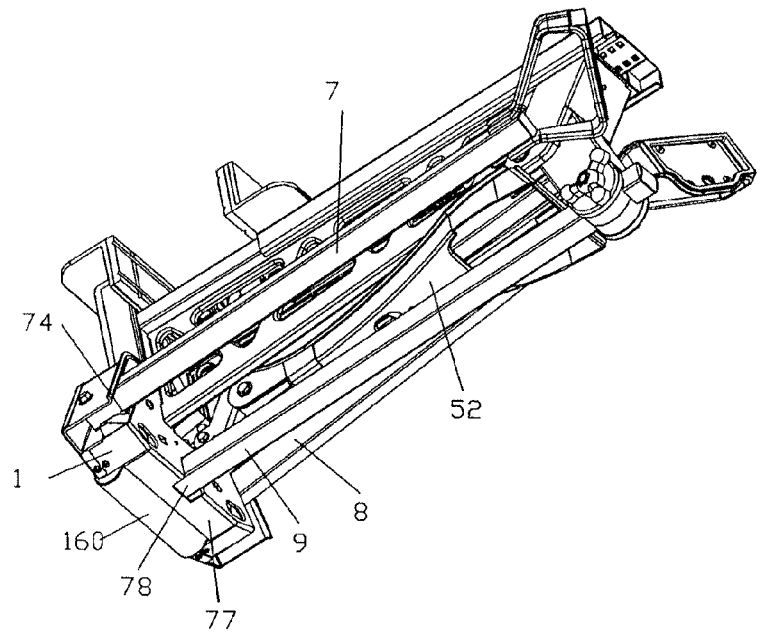
FIG. 16 is a perspective view of the first embodiment of the clamping device of the present invention in a storage position.
Figure 17:
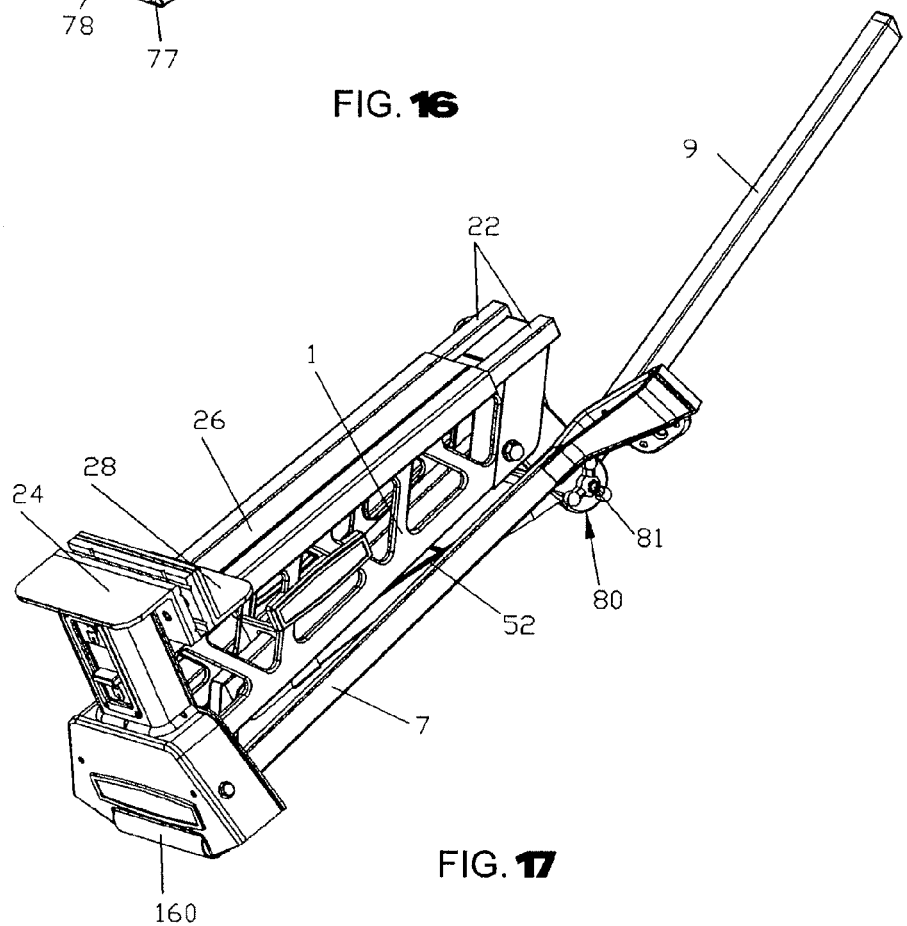
FIG. 17 is a perspective view of the first embodiment of the clamping device of the present invention in a transportation position.

The foldable frame 6 includes first, second and third legs 7, 8 and 9 which are pivotally mounted on the support structure 1 through first, second and third axes 16, 18 (see FIG. 6) and 20 (see FIG. 2) respectively. The centre of gravity of the clamping device is located near the proximal end 2. The first and second legs 7 and 8 straddle the proximal end 2 and the third leg 9 is connected to the distal end 3. The first and second legs 7 and 8 are foldable back along the sides of the support structure 1 (as shown in FIG. 16 and FIG. 17). The third leg 9 provides a longitudinal slot 10 for receiving the third axis 20. The third leg 9 is foldable up to lie along the length of the support structure 1 for storage (as shown in FIG. 16) or foldable back to act as a handle for transportation (as shown in FIG. 17). Furthermore the third leg 9 is slidable relative to the third axis 20.

Referring to FIG. 1, the floor-bearing end of each of the first and second legs 7 and 8 is equipped with a support foot 30 to increase frictional force with the floor so that the foldable frame 6 can stably support the support structure 1. The support foot 30 is stirrup-shaped and includes two lateral support members 31, 32 and a foot plate 34 connected between the two support members 31, 32. The support members 31, 32 and the foot plate 34 together define a void 35 to accommodate a user's foot to increase stability during operation. The foot plate 34 is not directly connected to the floor (see FIG. 4). The foot plate 34 has a concavity 36 and a support pad 38 received in the concavity 36 which is in direct contact with the floor to increase frictional contact between the legs 7, 8 and the floor whilst preventing damage to polished floor finishes. The support pad 38 is attached to the foot plate 34 by bolts 40.

The foot plate 34 has a threaded hole 42 to optionally fasten the support foot 30 to the floor.

As shown in FIG. 5, the third leg 9 has a first end 11 connected to the support structure 1 opposite to a second floor-bearing end 12. The second floor-bearing end 12 is equipped with a frictional pad 14 to increase frictional contact with the floor whereby the third leg 9 and the first and second legs 7 and 8 together stably support the support structure 1.

For use on soft ground (see FIG. 31), the clamping device may be equipped with a skidproof element 250 attached to the foot plate 34. The skidproof element 250 comprises a coupling plate (not shown) which is attached to the foot plate 34 and is fitted with nails 251 which sink into the soft ground to increase the stability of the clamping device. For use on a smooth concrete floor, the skidproof element 250 may be detached.

Figure 2:
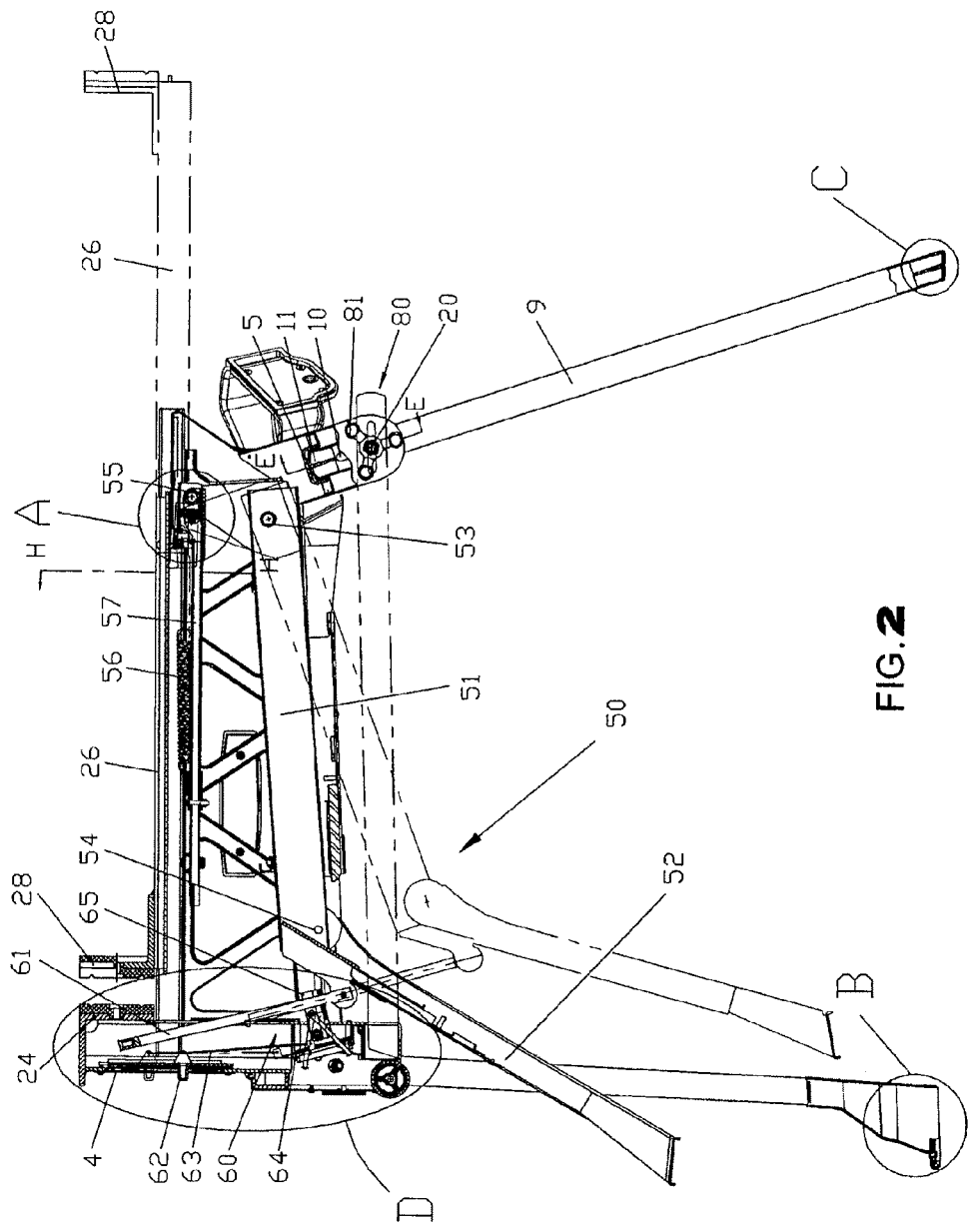
FIG. 2 is a partial section view of the clamping device of FIG. 1.

As shown in FIGS. 2 and 3, the advancing clamping mechanism 50 includes a lever 51 pivotally mounted at its distal end on the support structure 1 through a fourth axis 53. A foot pedal 52 is pivotally mounted on the proximal end of the lever 51 through a fifth axis 54. An elongate advancing member 55 with pawls 58 is pivotally mounted on the distal end of the lever 51. An oriented arm 57 is slidably connected to the support structure 1. Tension springs 56 are disposed between the support structure 1 and the oriented arm 57 (see FIG. 11) and a plurality of apertures 48 are disposed in the sliding track 26 for engaging the pawls 58.

As shown in FIG. 3, a spring 59 is disposed between the advancing member 55 and the oriented arm 57. The spring 59 is biased to cause the pawls 58 to snap into one of the apertures 48. The fixed track 22 provides a stopper 66 to stop the pawls 58 engaging the apertures 48 by restricting upward movement when the lever 51 is in its rest position. Thus the user may reverse the sliding track 26 (shown in broken outline in FIG. 2) to exploit a very broad range of openings between the fixed jaw 24 and movable jaw 28.

During use, the user activates the foot pedal 52 by foot to cause the lever 51 to pivot around the fourth axis 53 to the position shown in broken outline in FIG. 2. The lever 51 and oriented arm 57 cause the advancing member 55 to move in a proximal direction whereby the advancing member 55 disengages the stopper 66 and the pawls 58 are urged by the spring 59 to engage the apertures 48 as the sliding track 26 and movable jaw 28 move towards the fixed jaw 24. When the user releases the foot pedal 52, the lever 51 and the foot pedal 52 return to their rest position under the tension spring 56. The advancing member 55 is retracted to disengage the pawls 58 from the apertures 48 and restricted by the stopper 66. Thus repeatedly stepping the foot pedal 52 actuates the pawls 58 to engage the apertures 48 one by one thereby continuously moving the sliding track 26 and movable jaw 28 stepwise towards the fixed jaw 24. The foot pedal 52 is foldable around the fifth axis 54 to lie along the length of the support structure 1 (as shown in broken outline in FIG. 2).

Figure 10A:
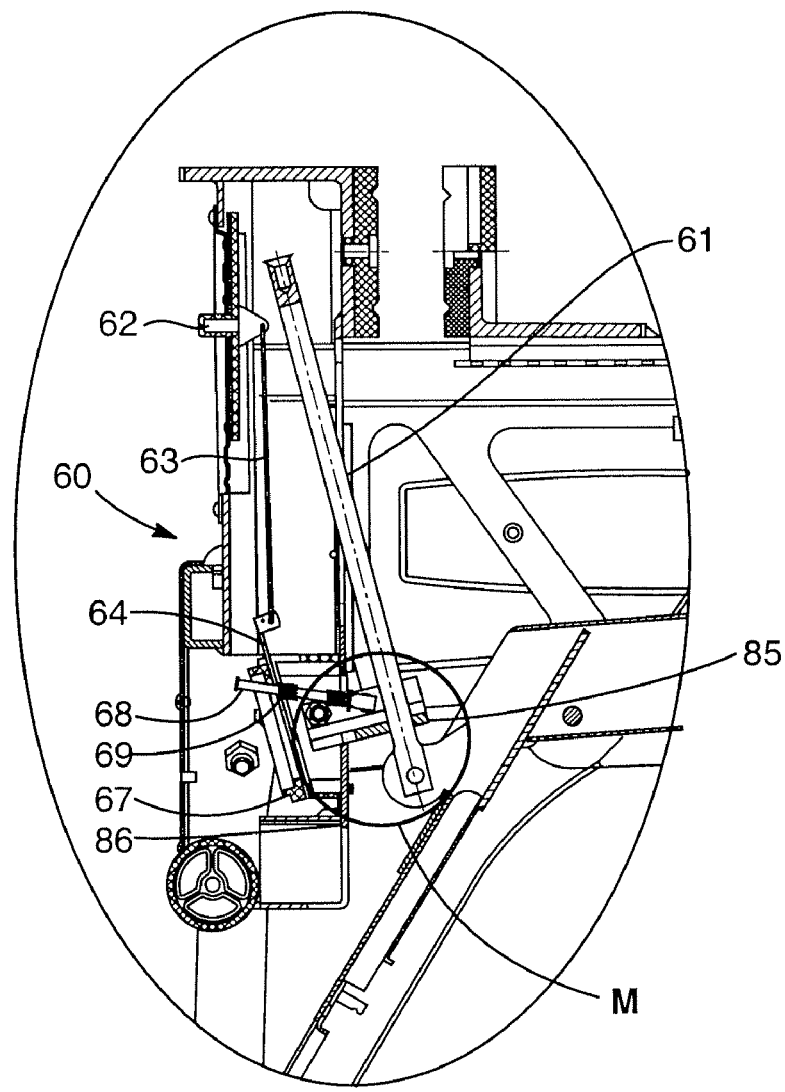
FIG. 10a is an enlarged view according to the indicator D in FIG. 2, wherein the locking mechanism is in a released position.
Figure 10B:
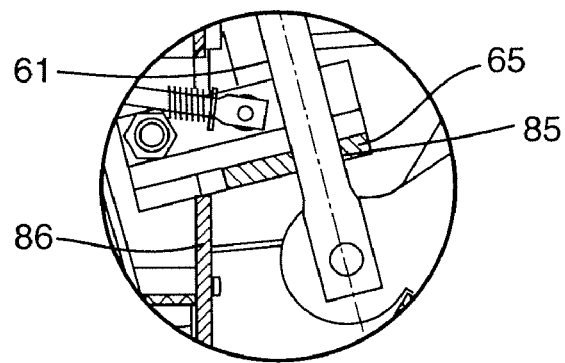
FIG. 10b is an enlarged view according to the indicator D in FIG. 2, wherein the locking mechanism is in a locked position.
Figure 11:
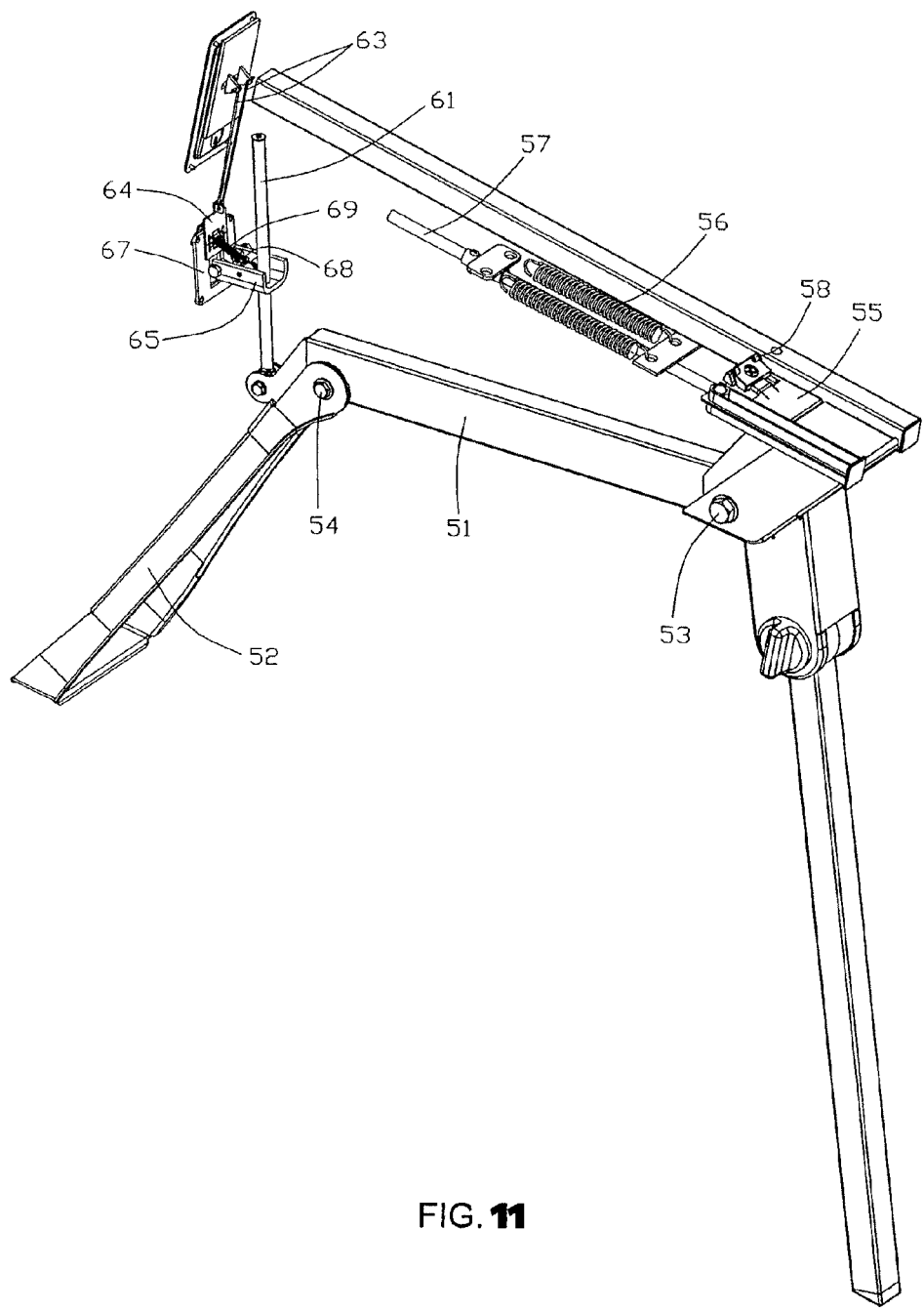
FIG. 11 is an exploded view of the locking mechanism.

Referring to FIG. 2, the lever 51 further includes a locking mechanism 60. As shown in FIGS. 10a, 10b and 11, the locking mechanism 60 includes a pole 61 pivotally mounted on the lever 51 and a button 62 slidably mounted in the front board 4. A link 63 couples the rear of the button 62 to a sliding block 64. A fixed plate 67 is attached to the support structure 1 and a locking plate 65 is pivotally mounted on the fixed plate 67. A joint pole 68 has a first end which is connected to the sliding block 64 by a stopper and a second end which is pivotally connected to the locking plate 65. The joint pole 68 is slidable relative to but cannot escape from the sliding block 64. A spring 69 surrounds the joint pole 68. The sliding block 64 is slidably attached to the fixed plate 67 and the locking plate 65 has an aperture 85 (with a diameter greater than that of the pole 61) through which the pole 61 is able to extend.

Figure 10C:
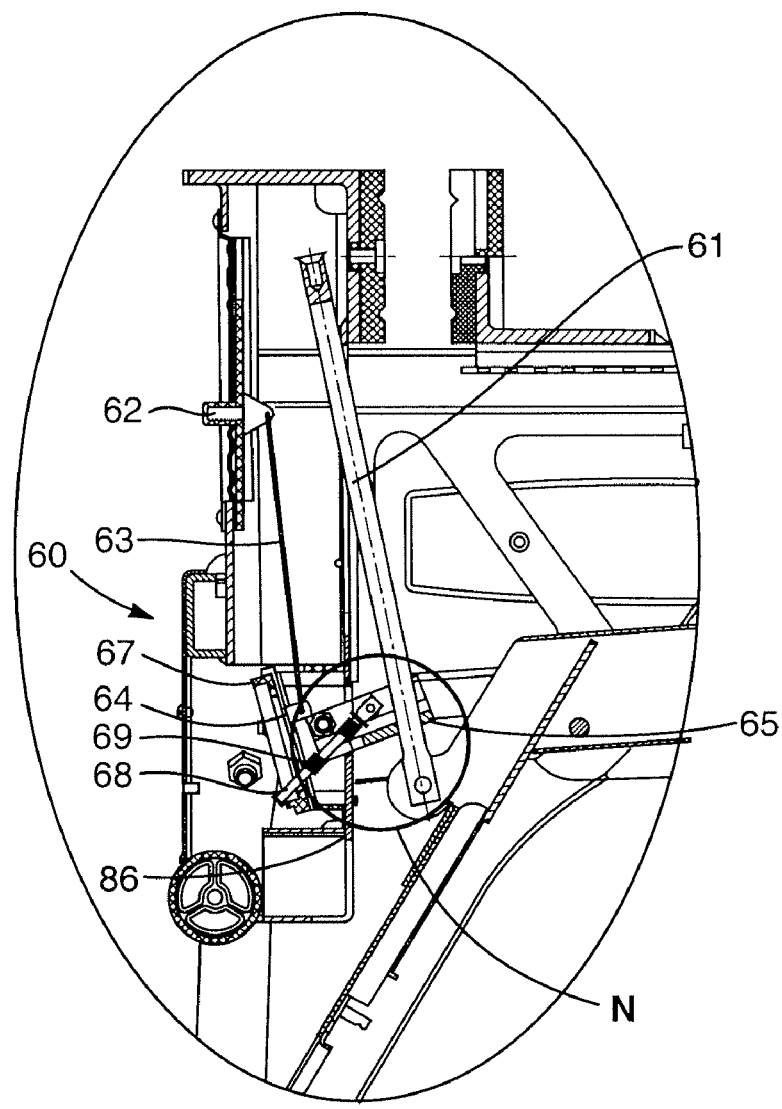
Figure 10D:
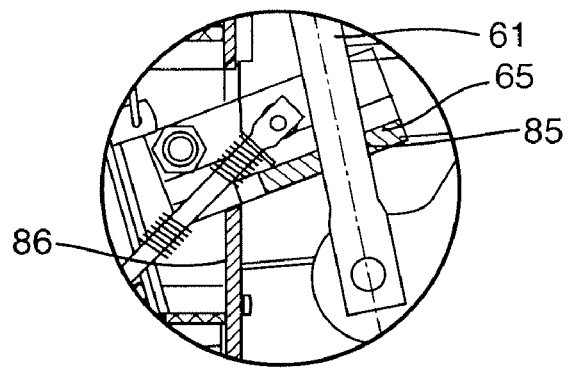
FIG. 10d is an enlarged view according to the indicator N in FIG. 10b.

Depressing the button 62 (as shown in FIGS. 10b and 10d) causes the link 63 and the sliding block 64 to move downwardly. The joint pole 68 is actuated to move downwardly along with the sliding block 64 and then the locking plate 65 is pushed and pivoted on a fixed axis (not labeled) to be moved upwardly to the locking position (see FIG. 10d). The aperture 85 becomes inclined with respect to a section of the pole 61 to make the pole 61 lodge therein and be delimited ie the pole 61 cannot move upwardly. At this moment, the foot activates the foot pedal 52 and the movable jaw 28 is locked.

Releasing the button 62 causes the link 63 and the sliding block 64 to move upwardly. The joint pole 68 moves upwardly along with the sliding block 64. The locking plate 65 is pivoted and returned to its released position where it is stopped by a stopper 86 from moving further downwardly (see FIGS. 10a and 10c) which allows free travel of the pole 61.

As shown in FIG. 7, a detent locking mechanism 70 is disposed between the first leg 7 and the support structure 1 for securing the first leg 7. A similar detent locking mechanism 70 is disposed between the second leg 8 and the support structure 1 (not shown in FIG. 7). The detent locking mechanism 70 includes a detent member 71 pivotally mounted on the support structure 1, a cover 77 fixed to the support structure 1 (see FIG. 16) and a compression spring 72 located between the detent member 71 and the support structure 1 (see FIG. 6). The compression spring 72 may be replaced with an elastic member such as a tension spring or torsion spring familiar to those skilled in the art.

The detent member 71 includes a first and second abutment member. In the present embodiment, the first abutment member is a surface 73 of the detent member 71 and the second abutment member is a detent pin 74. The detent member 71 has a slot 75 for receiving the compression spring 72. As shown in FIG. 7, the first leg 7 is located at a non-folded position and the first leg 7 is retained by the surface 73 abutting against the first leg 7. Thus the first and second legs 7 and 8 together support the support structure 1. When the detent member 71 is pivoted by the user's finger inserting into a hole 76, the surface 73 departs the first and second legs 7 and 8. The first and second legs 7 and 8 are then foldable about the first and second axes 16 and 18 to the folded position as shown in FIGS. 16 and 17. The first leg 7 is retained in this position by the detent pin 74 engaging the first and second legs 7 and 8.

Figure 8:
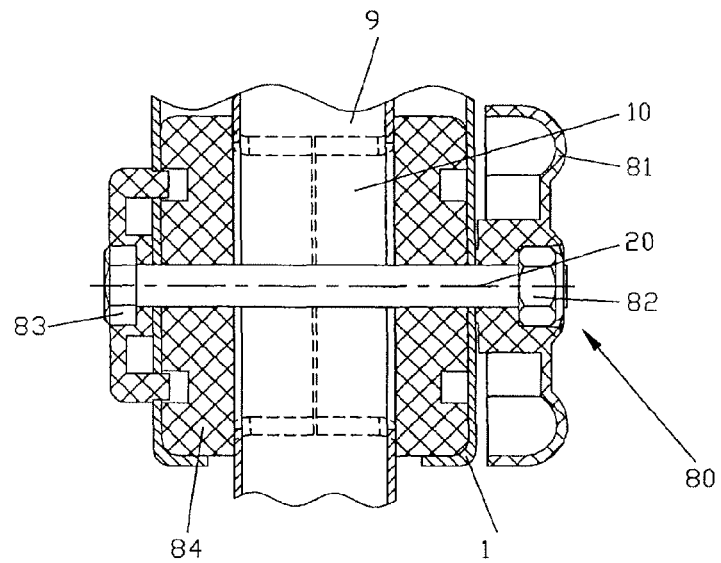
FIG. 8 is an enlarged cross-sectional view taken along line E-E in FIG. 2.

Referring to FIG. 7, a retaining mechanism 80 is disposed between the third leg 9 and the support structure 1 for retaining the third leg 9 in a desired position. As shown in FIG. 8, the retaining mechanism 80 includes a screw 83 extending through the two sides of the support structure 1 and the slot 10. A nut 82 engages the screw 83. Two clamping members 84 are substantially sandwiched between the support structure 1 and the third leg 9. A button 81 is attached to the nut 82 for conveniently revolving the nut 82. When the button 81 is loosened, a gap exists between the clamping member 84 and the third leg 9 so that the third leg 9 is capable of pivoting inwardly or outwardly of the support structure 1 about the third axis 20. When the third leg 9 reaches a desired position, the button 81 is tightened and the third leg 9 is secured to the support structure 1.

As shown in FIG. 2, the support structure 1 provides a slot 5 for receiving the first end 11 of the third leg 9 so that the third leg 9 is capable of reaching rapidly the support position.

Figure 9:
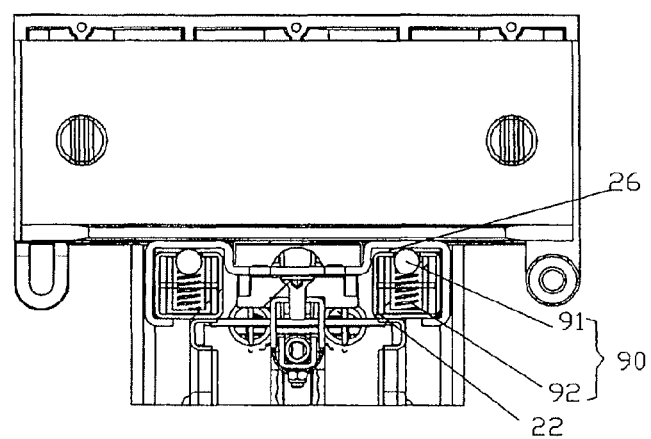
FIG. 9 is an enlarged cross-sectional view taken along line H-H in FIG. 2.

As shown in FIG. 9, a damper mechanism 90 is disposed between the fixed track 22 and the sliding track 26. The damper mechanism 90 includes a steel ball 91. The fixed track 22 has a recess for partly receiving the ball 91 securely. A compression spring 92 is disposed between the ball 91 and the fixed track 22. The damper mechanism 90 is capable of providing a gap between the fixed track 22 and the sliding track 26 to make the steel ball 91 support the sliding track 26 and dampen its movement. The damper mechanism 90 may be replaced with another mechanism such as a plastic member attached to the fixed track 22 or the sliding track 26 in a manner familiar to those skilled in the art.

Referring to FIG. 1, the clamping device includes a welding station which includes a first clamping unit 100 attached to the fixed jaw 24 and movable jaw 28 for holding a first workpiece 107 and a second clamping unit 110 attached to the sliding track 26 for holding a second workpiece 108. The first workpiece 107 is a welding member and the second workpiece 108 is a member to be welded and they may be welded together.

Figure 12:
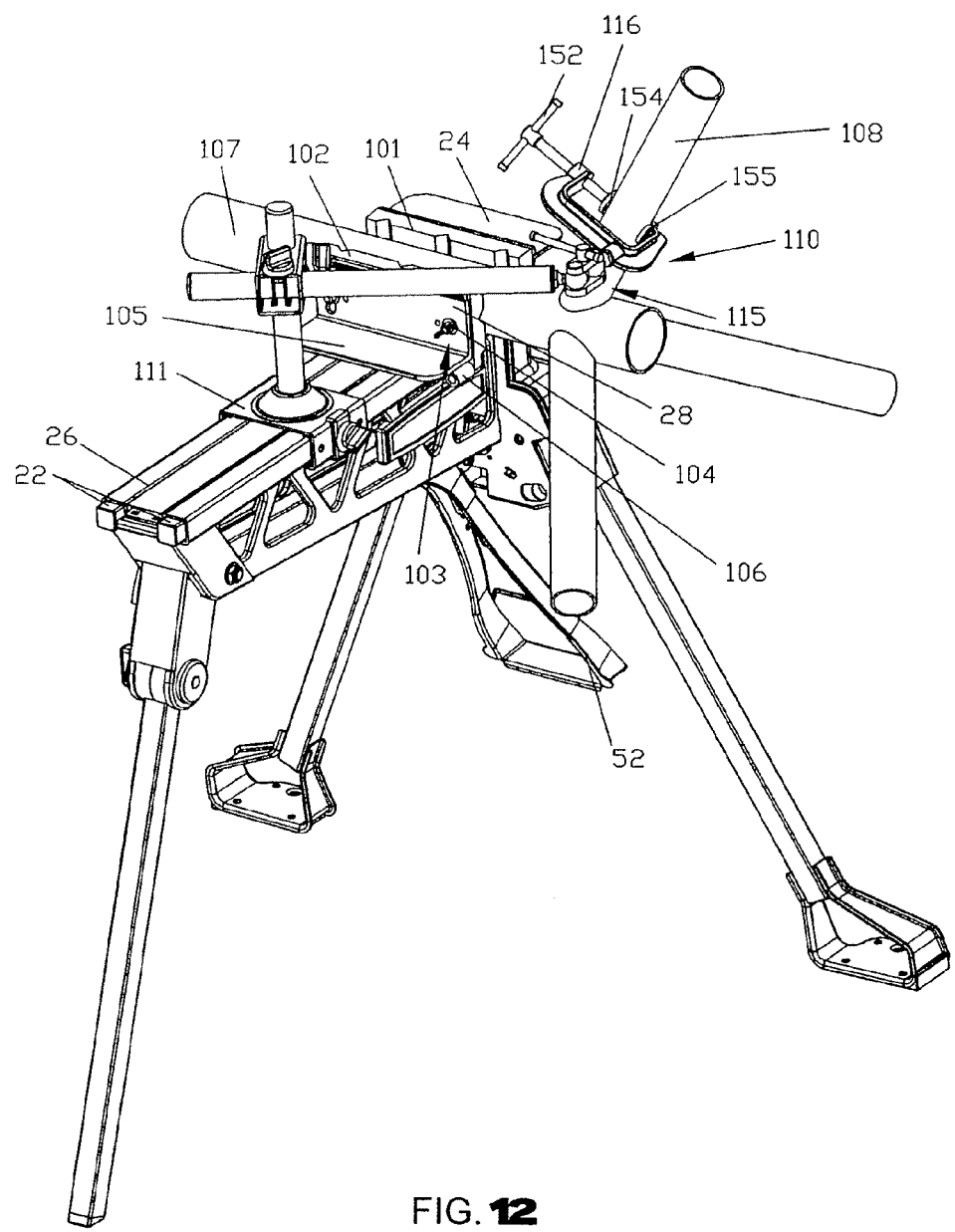
FIG. 12 is a perspective view of the first embodiment of the clamping device of the present invention with the welding station attached to the sliding track.

The first clamping unit 100 includes a fixed vice 101 fastened to the fixed jaw 24, a movable vice 102 fastened to the movable jaw 2 and a pair of first locking devices 103. As shown in FIG. 12, each first locking device 103 includes a pair of bolts (not shown), a pair of knobs 104 mounted on an end of the bolts for convenient operation and a pair of screw holes engaged by the bolts.

The bolts extend through the fixed jaw 24 and the fixed vice 101 to engage the screw holes disposed in the fixed vice 101. Thus the fixed vice 101 is fastened to the fixed jaw 24 by tightening the knob 104. Similarly the movable vice 102 is fastened to the movable jaw 28. By loosening the knob 104, the bolts disengage the screws holes so that the fixed vice 101 can be unfastened from the fixed jaw 24. Similarly the movable vice 102 can be unfastened from the movable jaw 28.

In a welding operation, the welding member and member to be welded may be steel tubes. Thus each of the fixed vice 101 and movable vice 102 has a working surface recessed with a V-shaped channel to permit clamping of a welding member having one of a variety of configurations such as a round rod.

To prevent the welding chip from damaging the clamping device, the fixed and movable vice 101 and 102 are typically made of aluminum. As shown in FIG. 12, the movable vice 102 has a protective plate 105 for protecting the sliding track 26.

The clamping device of the present invention is especially suitable for electric welding. For this purpose, the fixed vice 101 and movable vice 102 may be a suitable material. As shown in FIG. 1, a grounding column 106 is attached to the fixed vice 101. Similarly the grounding column 106 may be attached to the movable vice 102 (as shown in FIG. 12). The clamping device may be used in melt welding and the user may select the proper material and configuration of the jaws as required.

As shown in FIG. 12, the second clamping unit 110 may be actuated to a full clamping position. In other words, the second clamping unit 110 may hold the second workpiece 108 in any desired position. The second clamping unit 110 includes a bracket 111 attached to the sliding track 26, a clamping mechanism 116 for holding the second workpiece 108 and a coupling mechanism 115 for coupling the clamping mechanism 116 to the bracket 111 so that the clamping mechanism 116 can hold the workpiece in a desired position.

Figure 13:
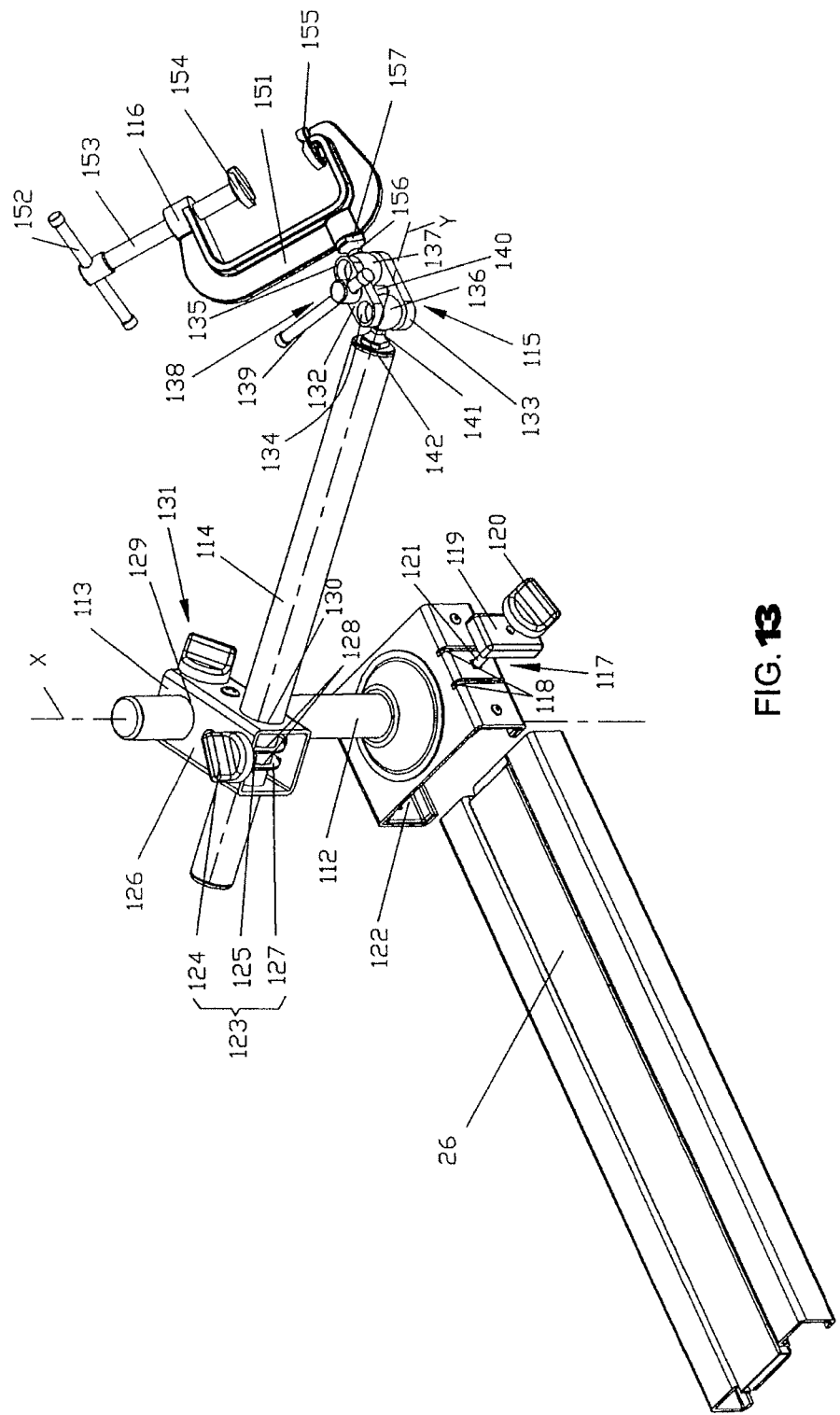
FIG. 13 is an exploded view of the second clamping unit of the welding station of FIG. 12.

As shown in FIG. 13, the coupling mechanism 115 includes a first and second compression plate 132 and 133. The first compression plate 132 is connected to the second compression plate 133 by a third locking device 138. The first compression plate 132 has two through holes 134 (only one hole is shown in FIG. 13) for receiving a first ball 136 and the second compression plate 133 has two through holes 135 (only one hole is shown in FIG. 13) for receiving a second ball 137.

As shown in FIG. 13, the third locking device 138 includes a compression rod 140 with a thread, a locking rod 139 and a nut (not shown). The compression rod 140 passes the first compression plate 132 to engage the thread (not shown) in the second compression plate 133 for adjusting a gap between the first and second compression plates 132 and 133. The nut prevents the compression rod 140 from escaping from the compression plates 132, 133.

The compression rod 140 has a hole for receiving the locking rod 139. Each end of the locking rod 139 has a protrusion so that the locking rod 139 cannot slide out of the compression rod 140. The locking rod 139 is slidable relative to the compression rod 140 so that the user is able to change conveniently leverage.

When the locking rod 139 is rotated to loosen the compression plates 132, 133, the gap between the first and second compression plate 132 and 133 is increased which makes the first and second ball 136 and 137 rotate more easily. The clamping mechanism 116 rotates along with the balls 136, 137 so as to be able to hold the workpiece in a desired position. When the locking rod 139 is further threaded relative to the compression rod 140, the gap between the first and second compression plate 132 and 133 is decreased which secures the first and second ball 136 and 137 so that the clamping mechanism 116 can be secured along with the balls 136 and 137.

The second clamping unit 110 further includes an adjustment mechanism for adjusting the coupling mechanism 115 in the direction of the X, Y axes.

As shown in FIG. 13, the adjustment mechanism includes a support bracket 113 and a first and second support arm 112, 114 slidable relative to the support bracket 113. The first support arm 112 is secured to the bracket 111. The second support arm 114 is fixed to the coupling mechanism 115 by the first ball 136.

The second support arm 114 has a screw hole and a threaded shaft 141 connected to the first ball 136 and engaged with the screw hole. The threaded shaft 141 is equipped with a hexagonal nut 142 to be easily operated by the user. The user screws the hexagonal nut 142 to make the threaded shaft 141 engage the screw hole so that the second arm 114 can be securely retained to the first ball 136.

The support bracket 113 has holes 129 and 130 for respectively receiving the first and second support arm 112 and 114. The first and second support arm 112 and 114 slide relative to the support bracket 113. The support bracket 113 rotates relative to the first support arm 112 so that the clamping mechanism 116 can be secured in any desired position.

A height locking mechanism 131 is located between the first support arm 112 and the support bracket 113 for retaining the support bracket 113 in the Y direction. A horizontal locking mechanism 123 is located between the second support arm 114 and the support bracket 113 for retaining the second support arm 114 in the X direction.

The height locking mechanism 131 and the horizontal locking mechanism 123 are substantially identical in structure. For simplicity, the horizontal locking mechanism 123 only is described. As shown in FIG. 13, the horizontal locking mechanism 123 includes a fastener 127 connected to the second support arm 114, a button 124, a threaded shaft connected to the button 124 and a nut 125 engaged with the threaded shaft.

The fastener 127 has through holes 128 of greater diameter than the second support arm 114 through which the second support arm 114 passes. The threaded shaft respectively passes the holes of the support bracket 113 and the fastener 127 engages the nut 125. The button 124 is threaded and the fastener 127 along with the second support arm 114 tend towards the upper surface 126 of the support bracket 113. Thus the second support arm 114 is engaged with the top of hole 130 in the bracket 113 and does not slide relative to the support bracket 113. When the button 124 is unfastened, the holes 128 in the fastener 127 are substantially arranged parallel with the second support arm 114 to allow free travel of the second support arm 114.

As shown in FIG. 13, the bracket 111 has a recess for receiving the sliding track 26 and rubber guide members 122 symmetrically disposed on the bracket 111 to prevent damage to the sliding track 26 and to assist the bracket 111 to slide more smoothly along the sliding track 26. A second locking mechanism 117 is disposed between the sliding track 26 and bracket 111 to secure the bracket 111 to the sliding track 26. The second locking mechanism 117 includes recess 118 formed in the bracket 111, a coupling member 119 engaged with the recess 118 by a bolt 121 and a knob 120. When the knob 120 is tightened, the coupling member 119 passes through the recess 118 to engage the sliding track 26 to prevent the bracket 111 from sliding relative to the sliding track 26. When the knob 120 is loosened, a gap exists between the coupling member 119 and the sliding track 26 to permit the bracket 111 to slide relative to the sliding track 26 to a desired position.

As shown in FIG. 13, the clamping mechanism 116 is a C-clamping mechanism which includes a clamping body 151, a fixed jaw member 155 fixed to the clamping body 151, a slide rod 153 extending through one end of the clamping body 151 and a handle 152 connected to the slide rod 153. The slide rod 153 further provides a movable jaw member 154 engageable with the fixed jaw member 155. The jaw members 154, 155 have working surfaces equipped with a V-shaped channel for holding a round steel tube.

The clamping body 151 has a screw hole, a threaded shaft 156 fixed to the second ball 137 and engaged with the screw hole. The threaded shaft 156 is equipped with a hexagonal nut 157 to be easily operated by the user. The user screws the hexagonal nut 157 to make the threaded shaft 156 engage the screw hole so that the C-clamping mechanism 116 is secured to the second ball 137.

The slide rod 153 has a hole for receiving the handle 152. Each end of the handle 152 has a protrusion so that the handle 152 cannot slide out of the hole. The handle 152 slides relative to the slide rod 153 so that the user is able to change conveniently the leverage.

In a welding operation (see FIG. 12), the first workpiece 107 is placed between the fixed jaw 24 and movable jaw 28. The button 62 is pushed down (see FIG. 10b) and the user steps on the foot pedal 52. The first workpiece 107 is clamped between the vices 101, 102. The second workpiece 108 is placed between the fixed jaw member 155 and the movable jaw member 154 and the handle 152 is rotated to clamp the second workpiece 108 between the jaw members 154, 155. The second workpiece 108 is then adjusted to a desired position. The C-clamping mechanism 116 is adjustable in the X, Y direction via operation of the adjustment mechanism or to a desired angle through the coupling mechanism 115 (as described hereinbefore). After the second workpiece 108 is clamped at the desired position, the user begins to weld. There are two clamping areas formed by the first and second clamping unit 100 and 110 which make welding very convenient.

Figure 14:
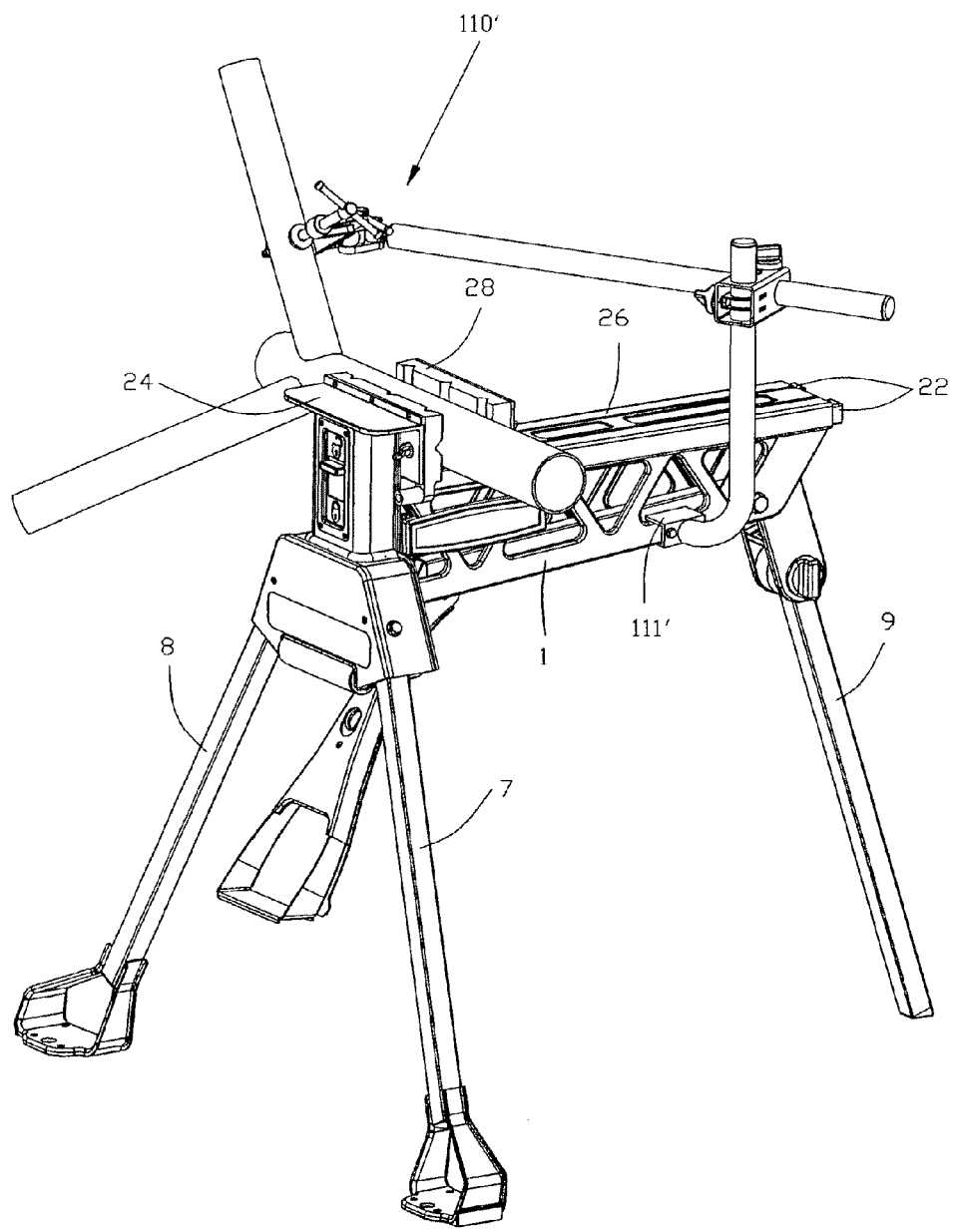
FIG. 14 is a perspective view of the first embodiment of the clamping device of the present invention with the welding station attached to the support structure.

The second clamping unit 110 may be fixed to other components of the clamping device of the invention. For example, it may be fixed to the support structure 1 or the fixed jaw 24. As shown in FIG. 14, the second clamping unit 110' is fixed to the support structure 1 by the bracket 111'. Its configuration and operation are similar to the second clamping unit 110 and therefore will not be described in detail.

The first clamping unit 100 is disposed on the fixed jaw 24 and movable jaw 28 for holding the first workpiece. The second clamping unit 110 is disposed on at least one of the sliding track, the support structure and the fixed vice for holding the second workpiece in a desired position which makes the clamping device have two clamping areas for easy operation (especially during welding).

In the present embodiment, the C-clamping mechanism 116 is rotatable to a desired angle by using the first and second ball 136 and 137.

If the user does not need the welding station, the fixed and movable vice 101 and 102 may be detached from the clamping device to facilitate use of the clamping device as a bench vice, pneumatic vice or hydraulic pressure vice.

Figure 15:
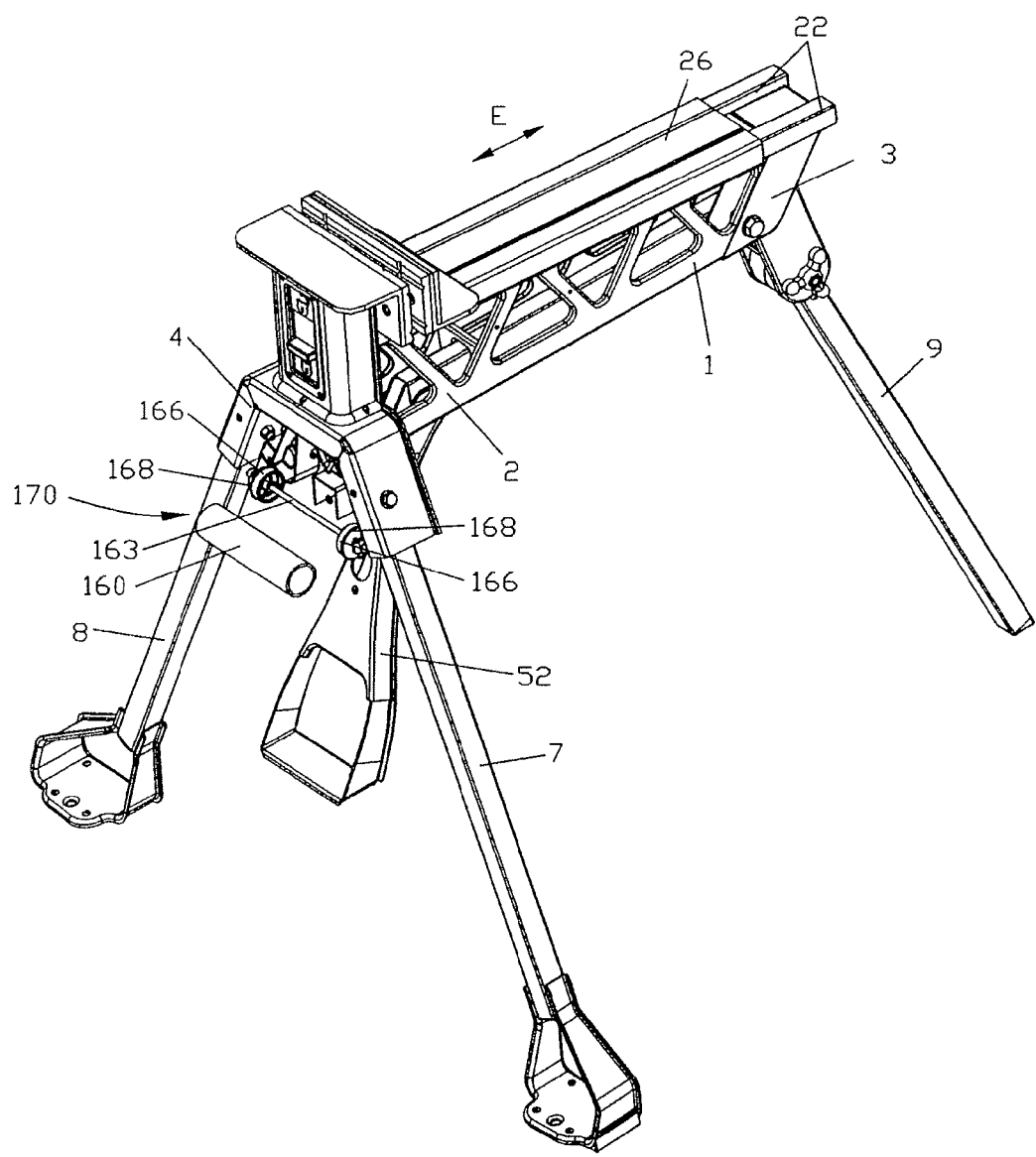
FIG. 15 is a perspective view of the first embodiment of the clamping device of the present invention with a wheel.

The clamping device has a transportation mechanism 170. As shown in FIG. 15, the transportation mechanism 170 may be used to transport the clamping device by rolling movement of a wheel 160. The transportation mechanism 170 comprises a wheel 160 and a rotatable shaft 163 extending in a transverse direction (not labeled) rotatably mounted on the proximal end 2. The wheel 160 is able to rotate around the rotatable shaft 163. The rotatable shaft 163 is substantially perpendicular to the sliding direction (E) of the sliding track 26. Two coupling members 166 are symmetrically disposed on opposite ends of the rotatable shaft 163 and the outer diameter of the coupling member 166 is shorter than the inner diameter of the wheel 160. Thus the wheel 160 is rotatably mounted to the coupling members 166. Each end of the coupling member 166 is equipped with a stopper 168 to prevent the wheel 160 sliding out of the coupling member 166.

The center of gravity of the clamping device is located near the proximal end 2 at a position adjacent to the wheel 160 to ensure stable transportation. The wheel 160 is mounted beneath and at the middle of the proximal end 2. A length of the wheel 160 is shorter than or equal to a length of the front board 4 in the transverse direction. Additionally, the diameter of the wheel 160 is small which reduces the packing volume of the clamping device and makes removal of the wheel 160 less troublesome. The length of the wheel 160 extending in the transverse direction is greater than the diameter of the wheel 160 which is convenient for transport. The wheel 160 may be rubber which is convenient for rolling movement.

The clamping device of the first embodiment has in general three operative positions.

The first position is a working position (see FIGS. 2, 7 and 15) in which the first and second legs 7 and 8 are retained in the erect position by the surface 73 abutting against the first and second legs 7 and 8 and the first end 11 of third leg 9 is received in the recess 5 of the support structure 1. The third leg 9 is adapted to be rigidly secured by tightening the button 81 whereby the first, second and third legs 7, 8 and 9 form a tripod to support the support structure 1. The clamping device has an appropriate height for convenient use.

The second position is a collection or packing position (see FIG. 16) in which the first and second legs 7 and 8 are folded back along the sides of the support structure 1 and secured by the pin 74 connected to the first and second legs 7 and 8. Likewise the third leg 9 is folded up to lie to along the length of the support structure 1. The cover 77 has a recess 78 for receiving straightforwardly the third leg 9. The foot pedal 52 is folded about the fifth axis 54 to lie along the length of the support structure 1. Additionally the diameter of the wheel 160 is sufficiently small to achieve compactness.

The third position is a transportation position (see FIG. 17) in which the first and second legs 7 and 8 are folded back along the sides of the support structure 1 and secured by the pin 74 connected to the first and second legs 7 and 8. The third leg 9 is folded back and secured by tightening the button 81 so as to be provided as a handle for transportation. The foot pedal 52 is folded about the fifth axis 54 to lie along the length of the support structure 1 and is secured by the first end 11 of the third leg 9 (not shown). The wheel 160 engages a surface whereby the support structure 1 is inclined relative to the surface by lifting the third leg 9 and supported by the wheel 160 for rolling movement along the surface. Thus the clamping device is easily transportable.

Figure 18:
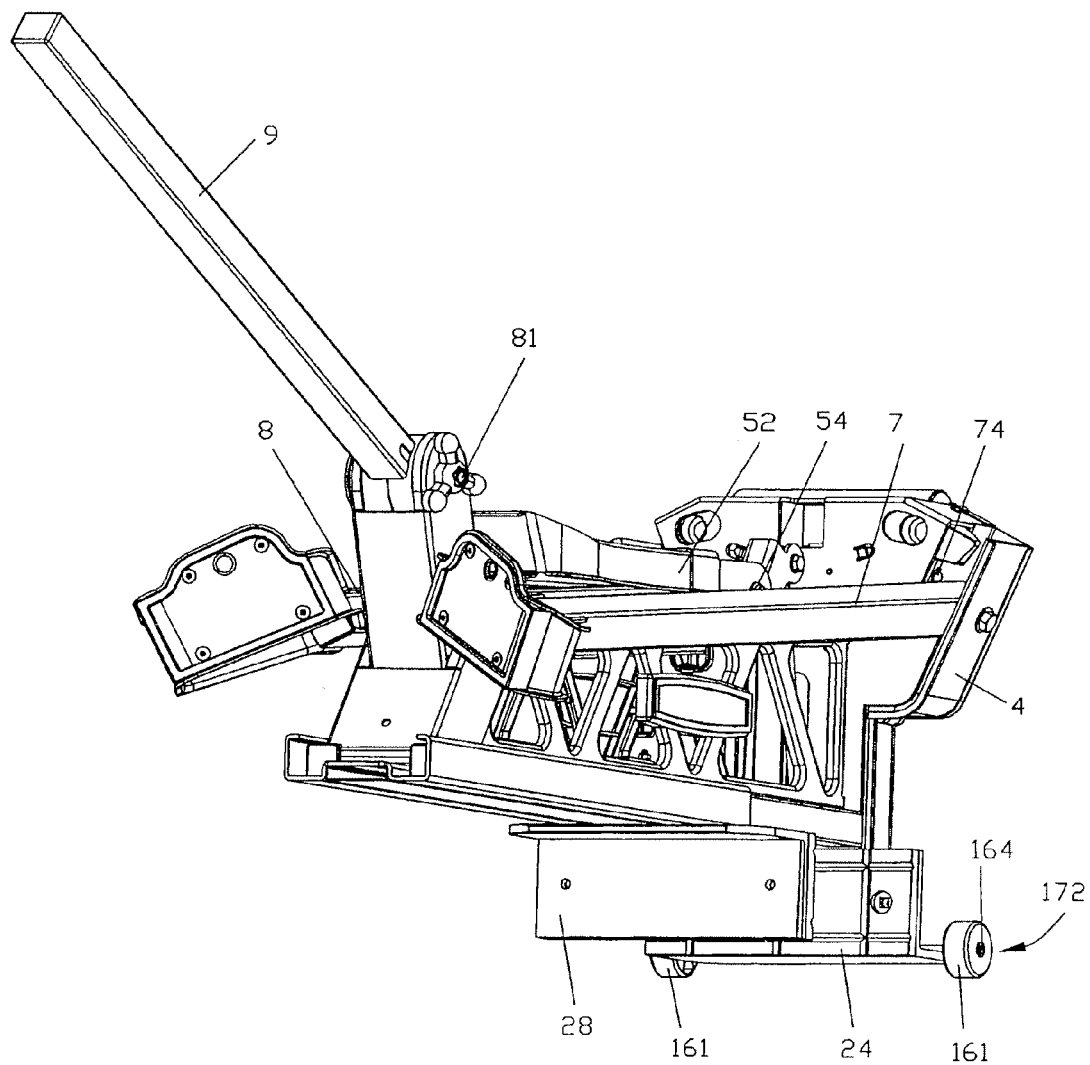
FIG. 18 is a perspective view of a second embodiment of the clamping device of the present invention with a second wheel.

An alternative transportation mechanism 172 is shown in a second embodiment of the present invention in FIG. 18. The transportation mechanism 172 is a pair of wheels 161 pivotally mounted on opposite sides of the fixed jaw 24 by a rotatable shaft 164 which is substantially perpendicular to the sliding direction of the sliding track 26. The transportation mechanism 172 may also have a wheel (which may be the same as wheel 160) disposed at the middle of the fixed jaw 24. The wheel may be mounted on other components of the clamping device (eg the front board 4).

The clamping device of the second embodiment has in general three positions. The first and second positions are similar to those described hereinbefore. The third position is a transportation position (see FIG. 18) in which the first and second legs 7 and 8 are folded back along the sides of the support structure 1 and secured by the pin 74 connected to the first and second legs 7 and 8. The third leg 9 is folded back and secured by tightening the button 81 to function as a handle for transportation. The foot pedal 52 is folded about the fifth axis 54 to lie along the length of the support structure 1 and is secured by the first end 11 of the third leg 9. The wheel 160 engages a surface and the support structure 1 is inclined relative to the surface by lifting the third leg 9 and supported by the wheel 160 for rolling movement along the surface. Thus the clamping device is easily transported very conveniently.

Figure 19:
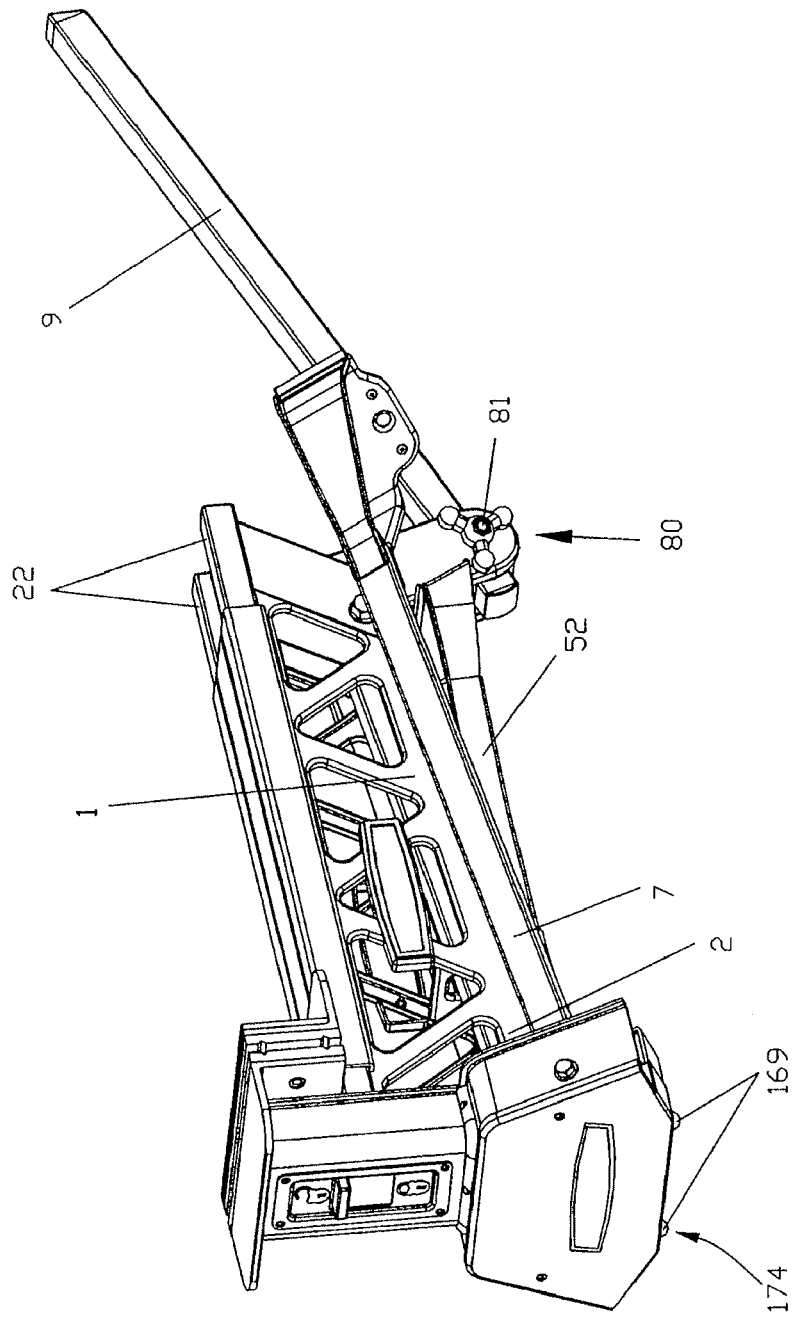
FIG. 19 is a perspective view of a third embodiment of the clamping device of the present invention with a sliding member.

An alternative transportation mechanism is a sliding mechanism 174 (see FIG. 19). The sliding mechanism 174 comprises two sliding members 169 symmetrically spaced apart at the proximal end 2 of the support structure 1. Each sliding member 169 has a slippery surface and is made of wearable material. Thus the clamping device is slidable along a surface.

The clamping device of the third embodiment has in general three positions. The first and second positions are similar to those described hereinbefore. The third position is a transportation position (see FIG. 19) in which the first and second legs 7 and 8 and the foot pedal 52 are folded back along the sides of the support structure 1 and secured. The sliding member 169 engages a surface and the support structure 1 is inclined relative to the surface by lifting the third leg 9 for sliding movement along the surface. The clamping device is transported very conveniently.

Figure 20:
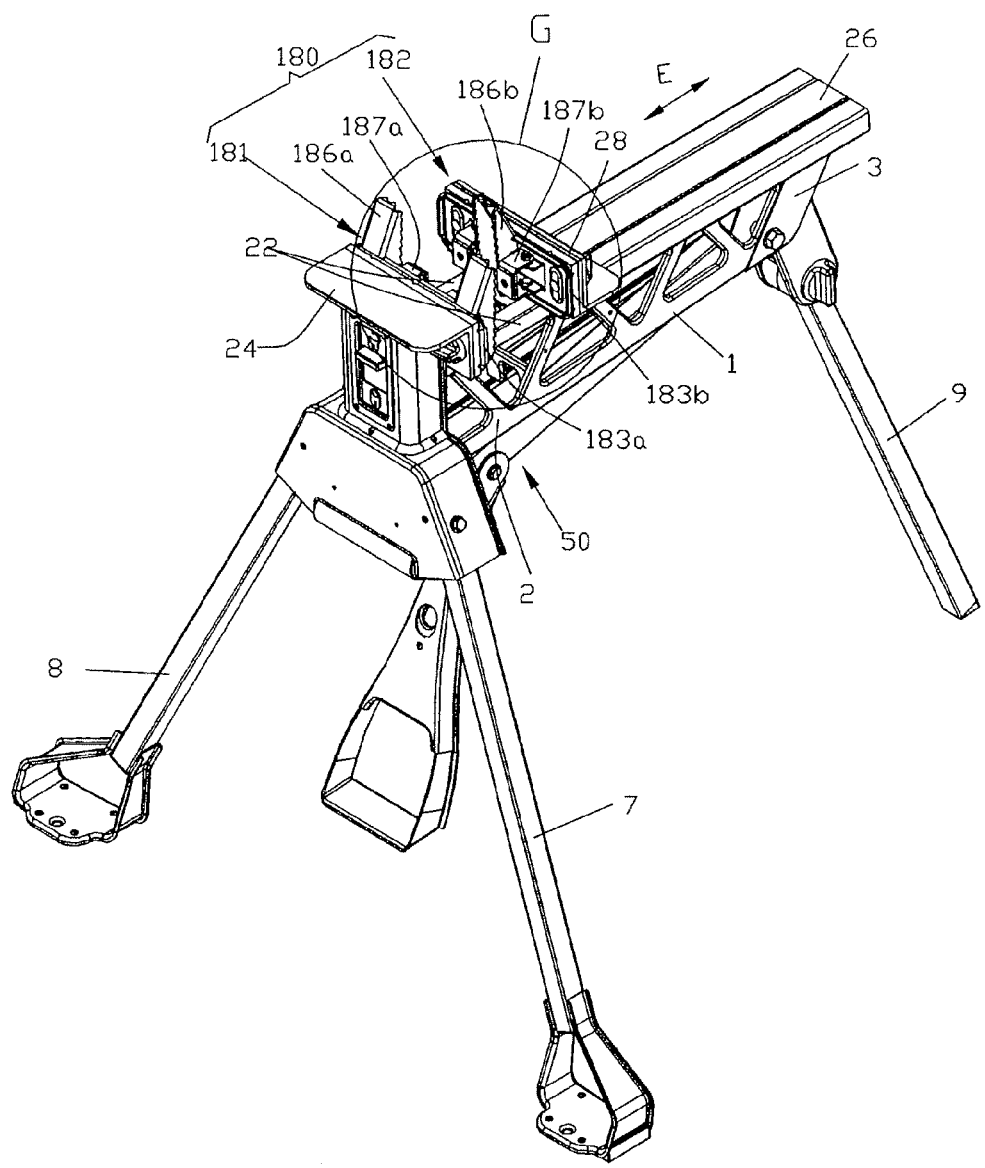
FIG. 20 is a perspective view of a fourth embodiment of the clamping device of the present invention with a first sectional jaw.

The clamping device of a fourth embodiment has a detachable sectional jaw 180 attached to the vices for holding a workpiece straightforwardly (see FIG. 20). The sectional jaw 180 includes a fixed vice 181 and a movable vice 182 respectively attached to the fixed jaw 24 and the movable jaw 28. Each of the vices 181, 182 has a base, a first clamping block and a second clamping block. At least one of the clamping blocks is movably mounted on the base which makes the first and the second clamping block selective to work alternatively. The first clamping block is a pair of fixed clamping blocks 186a, 186b fixed to the base 183a, 183b respectively. The second clamping block is a pair of movable clamping blocks 187a, 187b pivotally mounted on the base 183a, 183b respectively.

Figure 21:
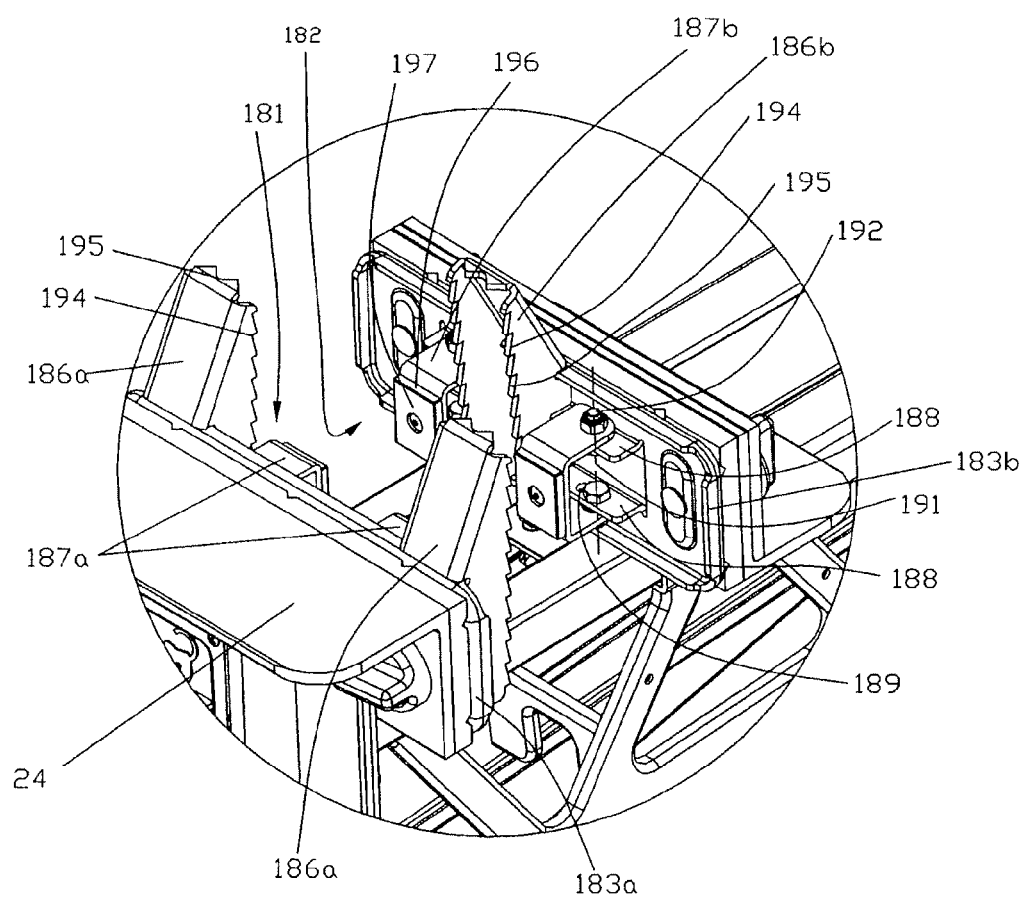
FIG. 21 is an enlarged view according to the indicator G in FIG. 20.

As shown in FIG. 21, the fixed vice 181 includes a base 183a attached to the fixed jaw 24, a pair of fixed clamping blocks 186a fixed to the base 183a and a pair of movable clamping blocks 187a pivotally mounted on the base 183a. The fixed clamping blocks 186a may be integral with the base 183a. The pair of fixed clamping blocks 186a is fixed astride the movable clamping blocks 187a. The movable vice 182 includes a base 183b attached to the movable jaw 28, a fixed clamping block 186b fixed to the base 183b and a pair of movable clamping blocks 187b pivotally mounted on the base 183b. The fixed clamping block 187b may be integral with the base 183b. The fixed clamping block 186b is fixed between the pair of movable clamping blocks 187b. The pair of movable clamping blocks 187a and the pair of movable clamping blocks 187b are symmetrically disposed for holding a thin workpiece such as a chainsaw bar. The pair of fixed clamping blocks 186a and the fixed clamping block 186b permit triangular clamping for securely holding a workpiece.

The fixed clamping blocks 186a, 186b have a first clamping portion 194 for engaging the workpiece. The first clamping portion 194 has a first clamping surface 195 with an indentation for holding shaped objects such as round rods or logs. The first clamping portion 194 can be replaced by other coarse surfaces to increase gripping ability of an irregular workpiece. The movable clamping blocks 187a, 187b have a second clamping portion 196 for engaging the workpiece. The second clamping portion 196 has a smooth planar clamping surface 197 for holding a thin workpiece such as a chainsaw bar. The second clamping portion 196 is typically made of rubber to avoid damaging a workpiece. The length of the second clamping portion 196 is less than the length of the workpiece in the vertical direction (see FIG. 25) to permit the chainsaw bar 231 to be clamped firmly whilst leaving chain 232 free to move for sharpening. The length of the first clamping portion 194 is greater than the length of the second clamping portion 196 in the vertical direction.

As shown in FIG. 21, each movable clamping block 187a, 187b is pivotally mounted on the base 183a, 183b about an axis 191 in the vertical direction and substantially perpendicular to the sliding direction (arrow "E") of the sliding track 26 (as shown in FIG. 20).

As shown in FIG. 21, the movable clamping block 187b is U shaped and the ends of the movable clamping block 187b have two symmetrical through holes (not shown). The base 183a provides a pair of protrusions 188. Each protrusion 188 has an elongate slot 189. A pair of bolts 192 (only one bolt is shown in FIG. 21) respectively passes through the holes of the movable clamping block 187b and the elongate slots 189 to engage with nuts (not labelled) to pivotally mount the movable clamping blocks 187b on the base 183b. Similarly the movable clamping blocks 187a are pivotally mounted on the base 183a. The movable clamping blocks 187b are adjustable relative to the protrusions 188 by the elongate slots 189 to permit the user to easily adjust the movable clamping block 187b in the horizontal direction.

Figure 22:
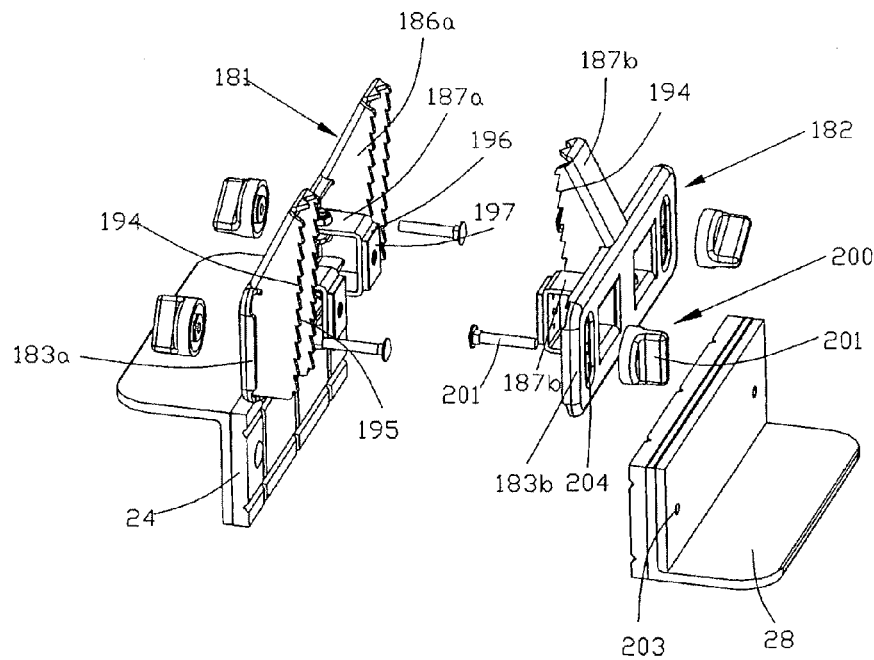
FIG. 22 is an exploded view of the first sectional jaw of FIG. 20 with the movable clamping block in the first position.

The clamping device has a locking mechanism 200 disposed between the fixed vice 181 and the fixed jaw 24. A similar locking mechanism 200 is disposed between the movable vice 182 and the movable jaw 28. As shown in FIG. 22, the locking mechanism 200 includes a pair of bolts 201 and a pair of knobs 202 engaged with the bolts 201. A pair of through holes 203 is formed in the movable jaw 28 and a pair of elongate slots 204 is formed in the base of the movable vice 182. The bolts 201 pass through the elongate slots 204 and the through holes 203 to engage the knobs 202. The movable vice 182 is attached to the movable jaw 28 by tightening the knobs 202 and the movable vice 182 is easily detached from the movable jaw 28 by loosening the knobs 202. The movable vice 182 is easily adjusted in the vertical direction relative to the movable jaw 28 by the elongate slots 204. Likewise, the fixed vice 181 is conveniently attached and detached by the knobs 202.

Figure 23:
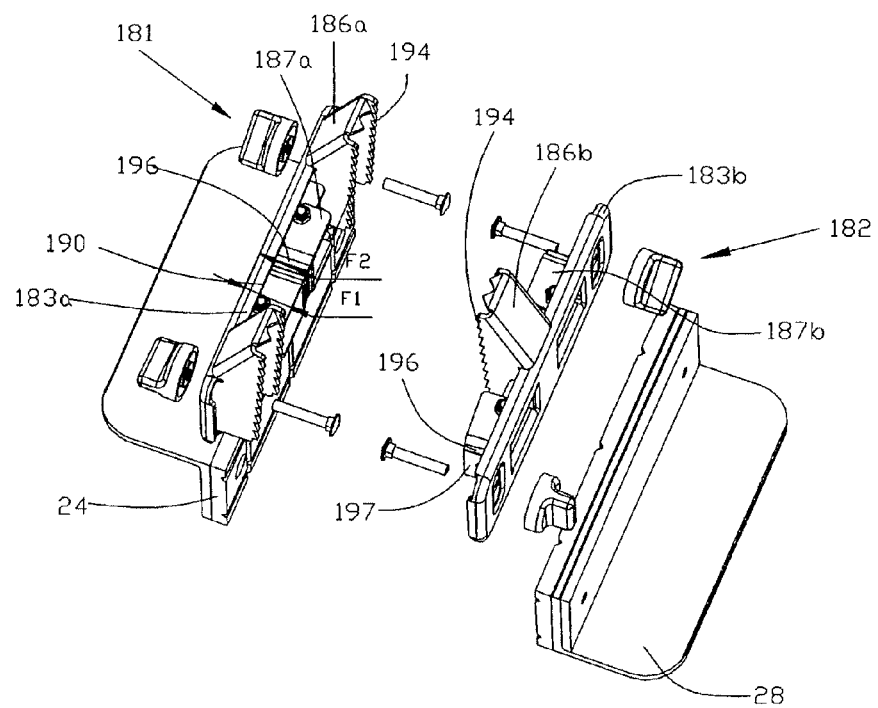
FIG. 23 is an exploded view of the first sectional jaw of FIG. 20 with the movable clamping block in the second position.

The movable clamping blocks 187a, 187b are capable of performing alternate working by pivoting relative to the base 183a, 183b. As shown in FIGS. 22 and 23, the movable clamping blocks 187a, 187b are pivotal between a first and second position.

Figure 24:
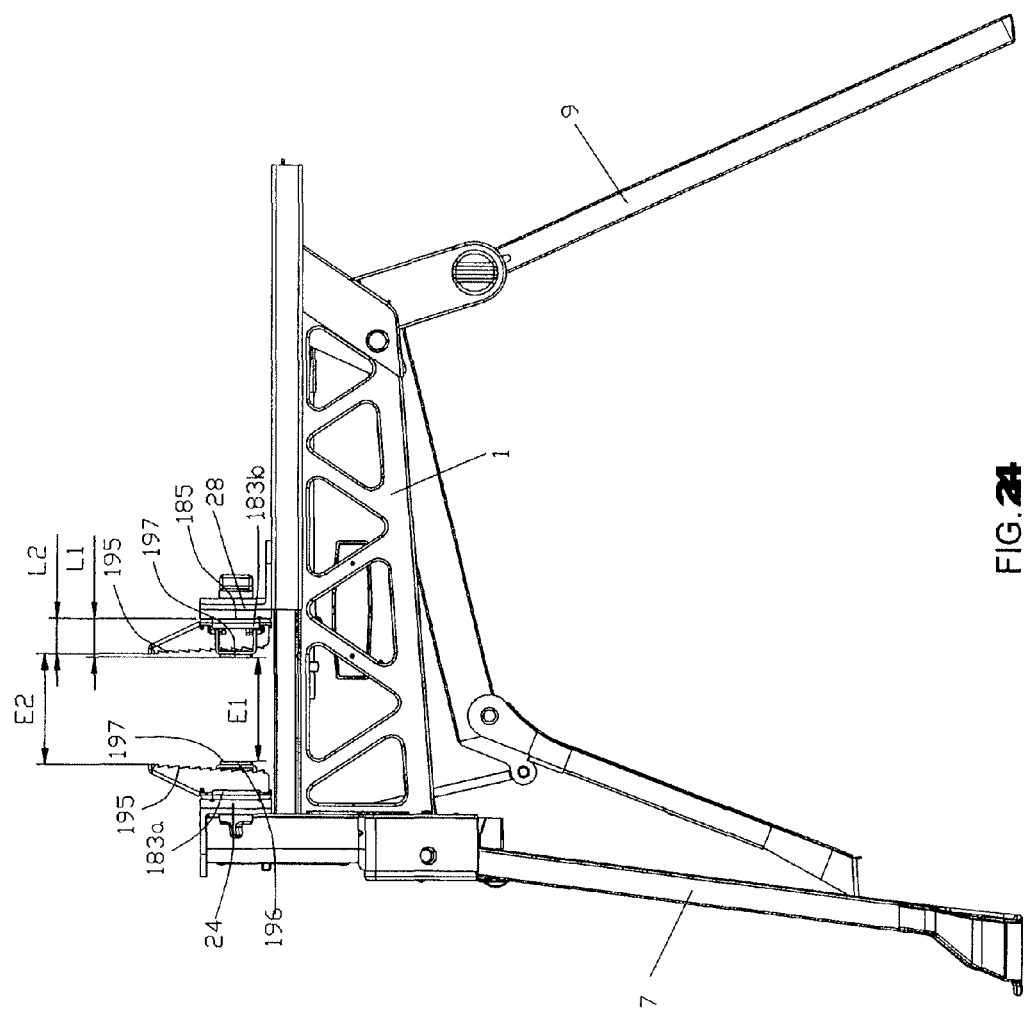
FIG. 24 is a side elevation of the clamping device of FIG. 20.

In the first position (see FIG. 22), the movable clamping blocks 187a, 187b are pivoted to the in use position and the second clamping portions 196 are oppositely disposed and parallel with the base 183a, 183b. For the sake of simplicity, only the movable clamping block 187b of the movable vice 182 is described. As shown in FIG. 24, the base 183b has an abutment surface 185 engaged with the movable jaw 28. L1 indicates a gap between the second clamping portion 196 and the abutment surface 185. L2 indicates a gap between the first clamping portion 194 and the abutment surface 185. L1 is longer than L2. Thus the gap ("E1") between the two second clamping portions 196 is less than the gap ("E2") between the two first clamping portions 194 so that the second clamping portion 196 contacts the workpiece and the second clamping surface 197 is the working surface for holding the workpiece.

Figure 25:
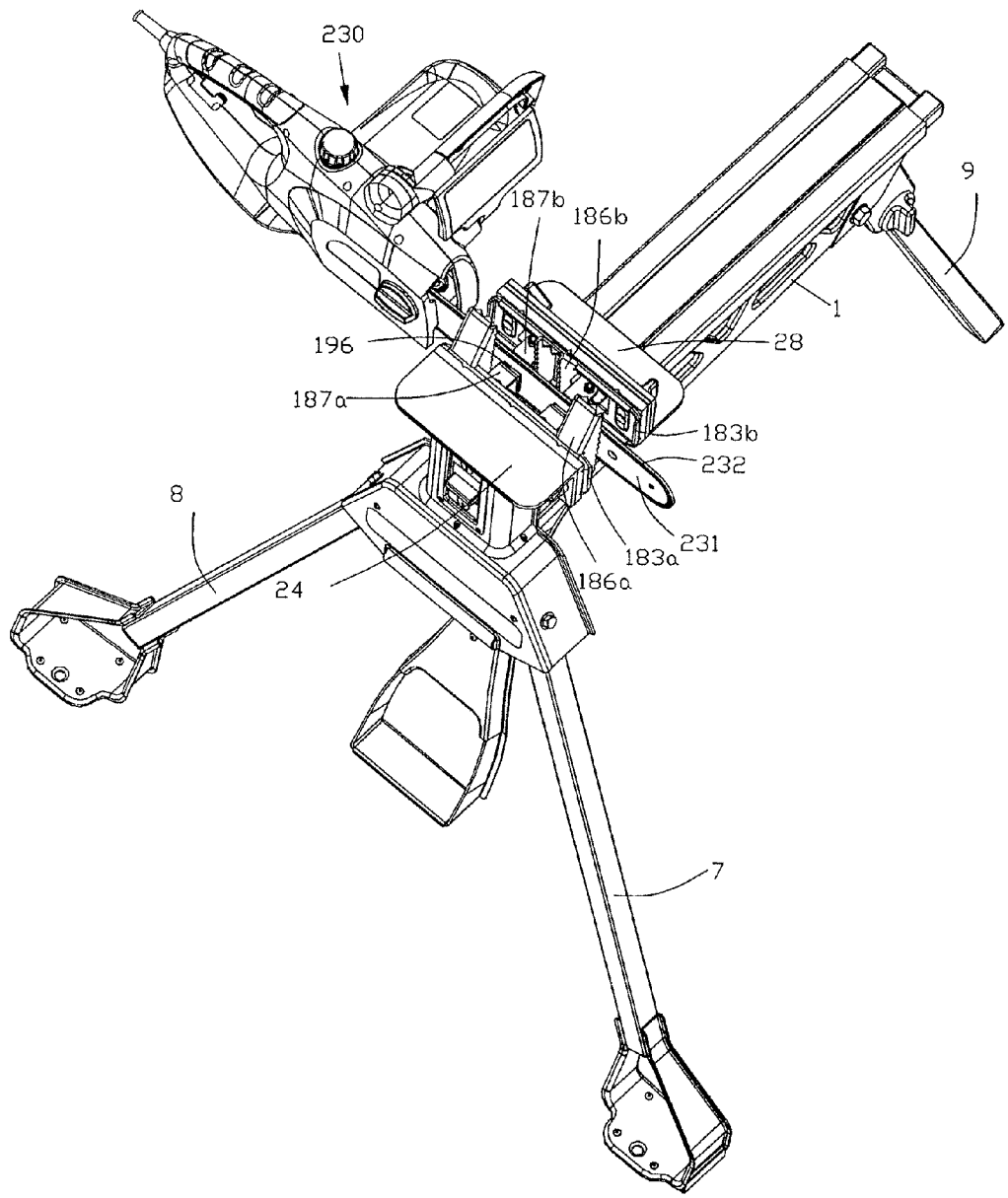
FIG. 25 is a perspective view of the clamping device of FIG. 20 for holding a chainsaw.

As shown in FIG. 25, the clamping device holds the bar 231 of the chainsaw 230. Because the length of the second clamping portion 196 is less than the length of the chainsaw bar 231 in the vertical direction, the chainsaw bar 231 is clamped firmly but the chain 232 is free to move for sharpening.

In the second position (see FIG. 23), the movable clamping blocks 187a, 187b are pivoted to the storage position and the second clamping portions 196 are abutting and perpendicular with the base 183a, 183b. For the sake of simplicity, only the movable clamping block 187a of the fixed vice 181 is described. The base 183a has an abutment surface 190 engaged with the fixed jaw 24. F1 indicates a gap between the movable clamping block 187a and the abutment surface 190. F2 indicates a gap between the clamping portion 194 of the fixed clamping block 186a and the abutment surface 185. F1 is shorter than F2. The length of the first clamping portion 194 is greater than the length of the second clamping portion 196 in the vertical direction. In this position, the first clamping portion 194 contacts the workpiece and the first clamping surface 195 is the working surface for holding the workpiece.

Figure 26:
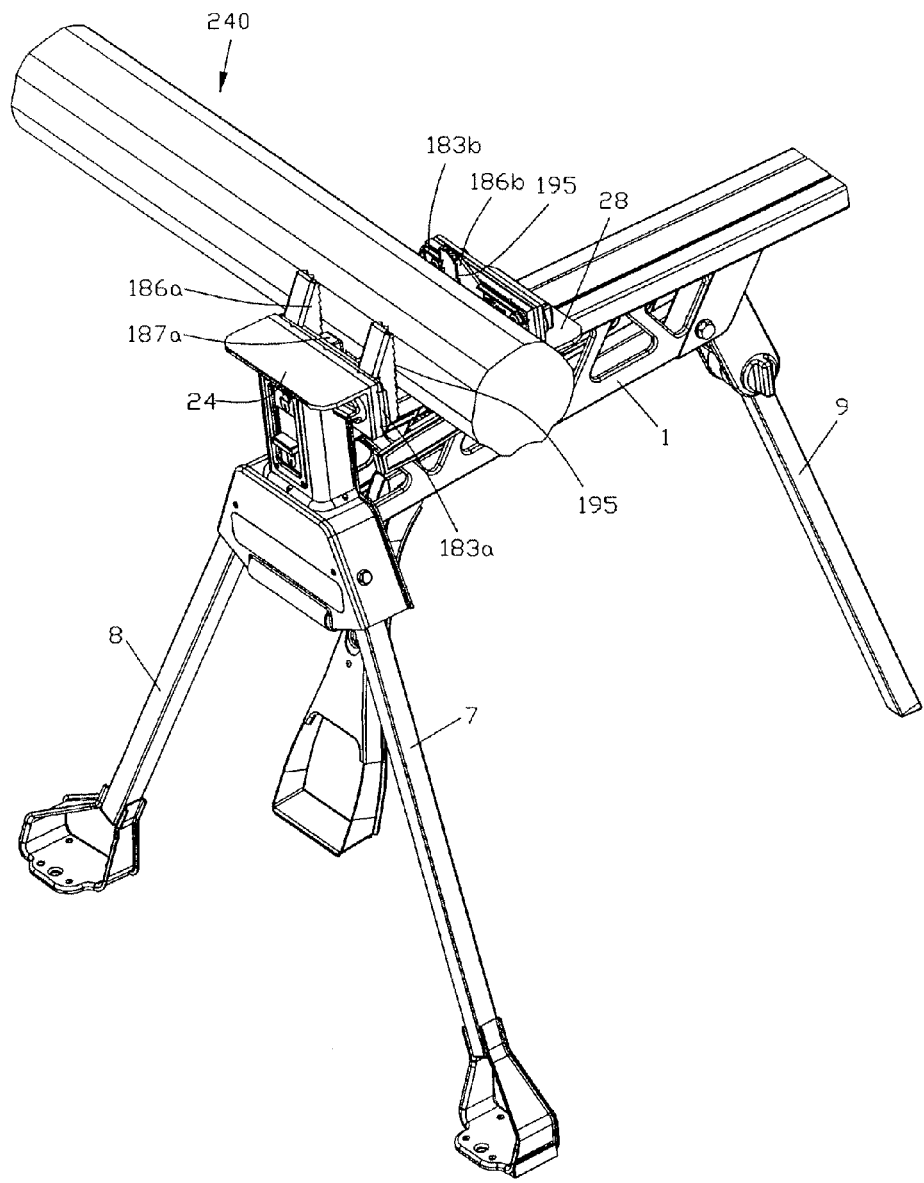
FIG. 26 is a perspective view of the clamping device of FIG. 20 for holding logs.

As shown in FIG. 26, the clamping device is used for holding logs 240. The fixed clamping blocks 186a, 186b provide a three-point contact with the workpiece for secure holding.

Figure 27:
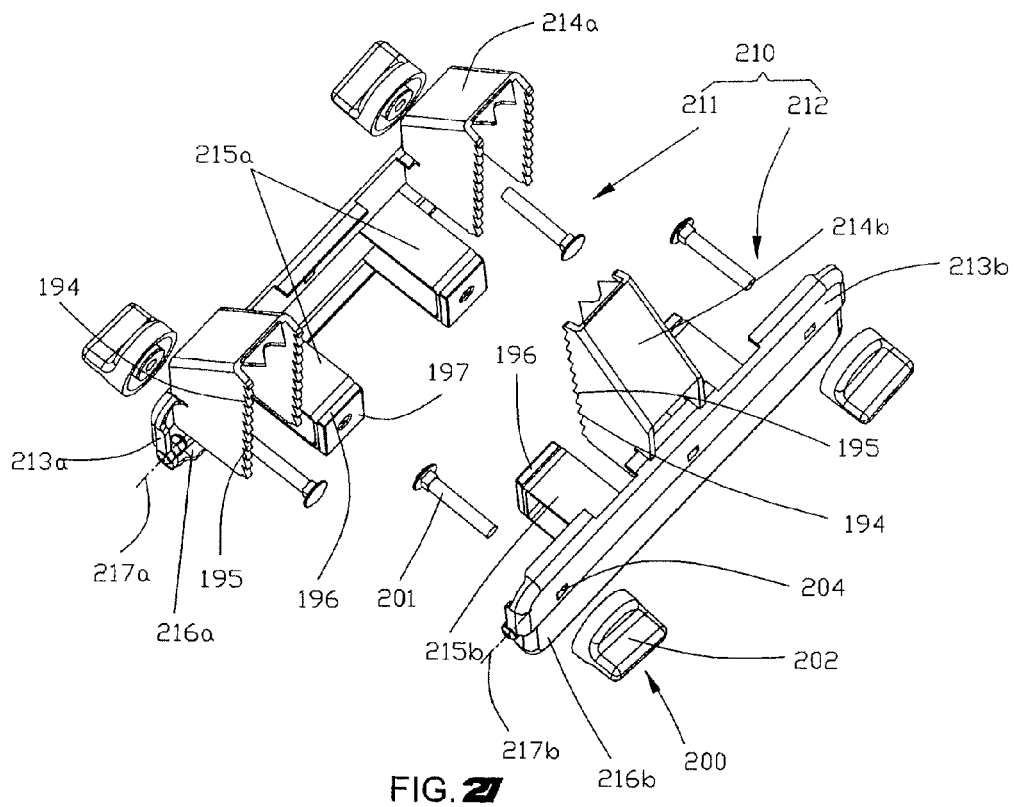
FIG. 27 is an exploded view of a fifth embodiment of the clamping device of the present invention with a second sectional jaw with a movable clamping block in the first position.
Figure 28:
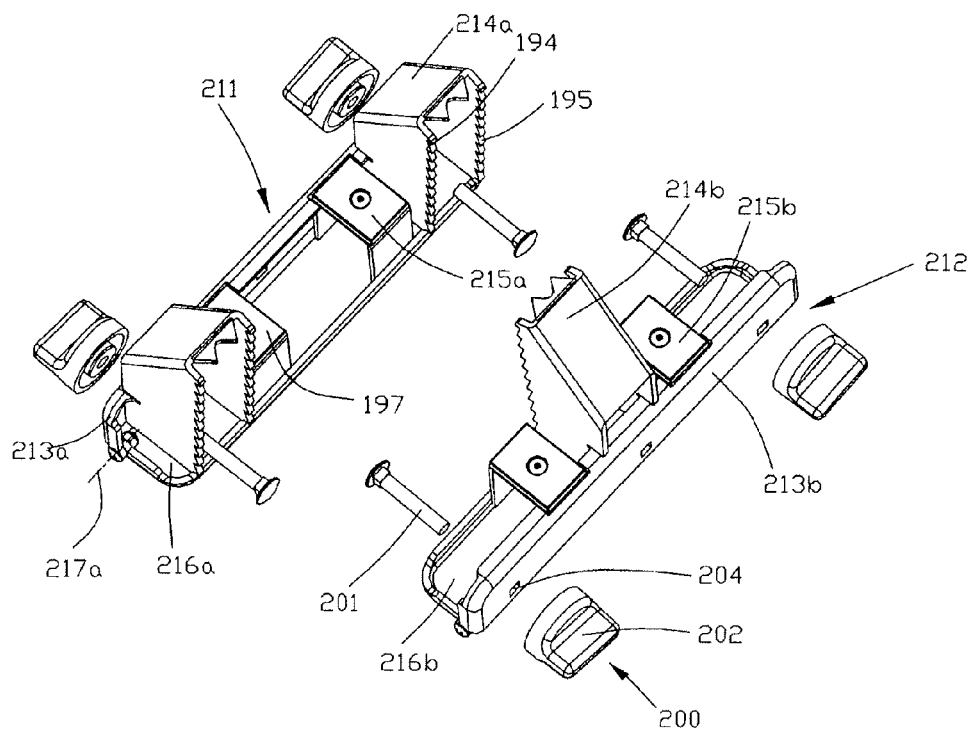
FIG. 28 is an exploded view of the second sectional jaw with the movable clamping block in the second position.

An alternative sectional jaw 210 is shown in a fifth embodiment of the present invention in FIGS. 27 and 28. The sectional jaw 210 includes a fixed vice 211 and a movable vice 212 attached respectively to the fixed jaw 24 and the movable jaw 28.

As shown in FIG. 27, the fixed vice 211 includes a base 213a attached to the fixed jaw 24, a pair of fixed clamping blocks 214a fixed to the base 213a and a pair of movable clamping blocks 215a pivotally mounted on the base 213a. The fixed clamping block 214a may be integral with the base 213a. The pair of fixed clamping blocks 214a is fixed astride the movable clamping blocks 215a. The pair of movable clamping blocks 215a is connected to a connecting block 216a which is pivotally mounted on the base 213a about a horizontal axis 217a.

The movable vice 212 includes a base 213b attached to the movable jaw 28, a fixed clamping block 214b fixed to the base 213b and a pair of movable clamping blocks 215b pivotally mounted on the base 213b. The fixed clamping block 214b may be integral with the base 213. The fixed clamping blocks 214b are fixed between the pair of movable clamping blocks 215b. The pair of movable clamping blocks 215b is connected to a connecting block 216b which is pivotally mounted on the base 213b about a horizontal axis 217b parallel with the axis 217a. The pair of movable clamping blocks 215a and the pair of movable clamping blocks 215b are symmetrically disposed for holding a thin workpiece.

The fixed clamping blocks 214a, 214b have a first clamping portion 194 for engaging the workpiece. The first clamping portion 194 has an indented clamping surface 195 for holding shaped objects such as round rods or logs. The movable clamping blocks 215a, 215b have a second clamping portion 196 for engaging the workpiece. The second clamping portion 196 has a smooth planar clamping surface 197 for holding a thin workpiece such as a chainsaw bar. The second clamping portion 196 is preferably made of rubber to avoid damaging the workpiece.

The locking mechanism 200 is similar to that described hereinbefore.

The movable clamping blocks 215a, 215b are capable of performing alternate working by pivoting relative to the base 213a, 213b. As shown in FIGS. 27 and 28, the movable clamping blocks 215a, 215b are pivoted between a first and second position by the connecting blocks 216a, 216b.

In the first position (see FIG. 27), the movable clamping blocks 215a, 215b are pivoted to the in use position and the second clamping portions 196 are oppositely disposed and parallel with the base 213a, 213b. The gap between the first clamping portion 194 and the base 213a, 213b is less than the gap between the second clamping portion 196 and the base 213a, 213b so that the second clamping portion 196 contacts the workpiece and the second clamping surface 197 is the working surface for holding the workpiece. In this position, the clamping device is primarily used for holding a chainsaw bar 231 (see FIG. 25).

In the second position (see FIG. 28), the movable clamping blocks 215a, 215b are pivoted to the storage position and the second clamping blocks 196 are perpendicular to the base 213a, 213b. A gap between the movable clamping blocks 215a and the base 213a, 213b is less than a gap between the clamping portion 194 and the base 213a, 213b so that the first clamping portion 194 contacts the workpiece and the first surface 195 is the working surface for holding the workpiece. In this position, the clamping device is primarily used for holding logs 240 (see FIG. 26).

When the chainsaw needs to be sharpened or maintained, the movable clamping blocks can be pivoted to the in use position so that the chainsaw bar 231 is held by the second surface 197. The movable clamping blocks are then pivoted to the storage position and the first surface 195 is the working surface for holding conveniently the workpiece. If the user does not need the sectional jaw, it is detached from the fixed jaw 24 and movable jaw 28 to facilitate use of the clamping device as a bench vice, pneumatic vice or hydraulic pressure vice.

Figure 29:
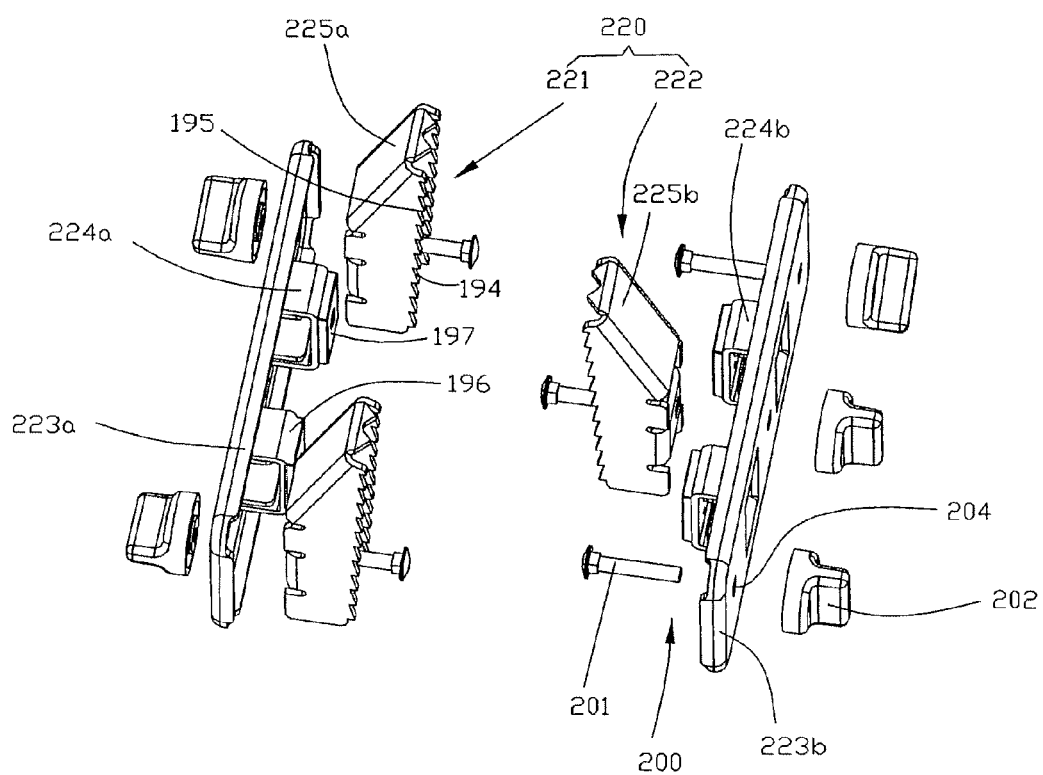
FIG. 29 is an exploded view of a sixth embodiment of the clamping device of the present invention with a third sectional jaw.

An alternative sectional jaw 220 is shown in a sixth embodiment of the present invention in FIG. 29. The sectional jaw 220 includes a fixed vice 221 and a movable vice 222 attached respectively to the fixed jaw 24 and the movable jaw 28.

As shown in FIG. 29, the fixed vice 221 includes a base 223a attached to the fixed jaw 24, a pair of fixed clamping blocks 224a fixed to the base 223a and a pair of movable clamping blocks 225a movably mounted on the base 223a. The pair of movable clamping blocks 225a is mounted astride the fixed clamping blocks 224a. The movable vice 222 includes a base 223b attached to the movable jaw 28, a pair of fixed clamping blocks 224b fixed to the base 223b and a movable clamping block 225b movably mounted on the base 223b. The fixed clamping block 224b is fixed between the pair of movable clamping blocks 225b. The pair of fixed clamping blocks 224a and the pair of fixed clamping blocks 225b are symmetrically disposed for holding a thin workpiece.

The movable clamping blocks 225a, 225b have a first clamping portion 194 for engaging the workpiece. The first clamping portion 194 has an indented clamping surface 195 for holding shaped objects such as round rods or logs. The fixed clamping blocks 224a, 224b have a second clamping portion 196 for engaging the workpiece. The second clamping portion 196 has a smooth planar clamping surface 197 for holding a thin workpiece such as a chainsaw bar. The second clamping portion 196 is preferably made of rubber to avoid damaging the workpiece.

The locking mechanism 200 is similar to that described hereinbefore. The movable clamping blocks 225a, 225b are movably mounted on the base 223a, 223b by the locking mechanism 200 and the first and second clamping portions 194, 196 are capable of performing alternate working. A gap between the second clamping portion 196 and the base 223a is less than a gap between the first clamping portion 194 and the base 223a.

The movable clamping blocks 225a, 225b have a first and second position. In the first position, the movable clamping blocks 225a, 225b are mounted on the base 223a, 223b by the locking mechanism 200. The gap between the second clamping portion 196 and the base 223a is less than the gap between the first clamping portion 194 and the base 223a so that the first clamping portion 194 contacts the workpiece and the first clamping surface 195 is the working surface for holding the workpiece. The clamping device is used primarily for holding logs 240 (as shown in FIG. 26). In the second position, the movable clamping blocks 225a, 225b are detached from the base 223a, 223b so that the second clamping portion 196 contacts the workpiece and the second clamping surface 197 is the working surface for holding the workpiece. The clamping device is used primarily for holding a chainsaw bar 231 (as shown in FIG. 25).

When a chainsaw needs to be sharpened or maintained, the movable clamping blocks 225a, 225b are detached from the base so that the chainsaw bar 231 may be held by the second surface 197 for sharpening. The movable clamping blocks 225a, 225b may be reinstated and the first surface 195 is the working surface for holding conveniently the workpiece.

Figure 30:
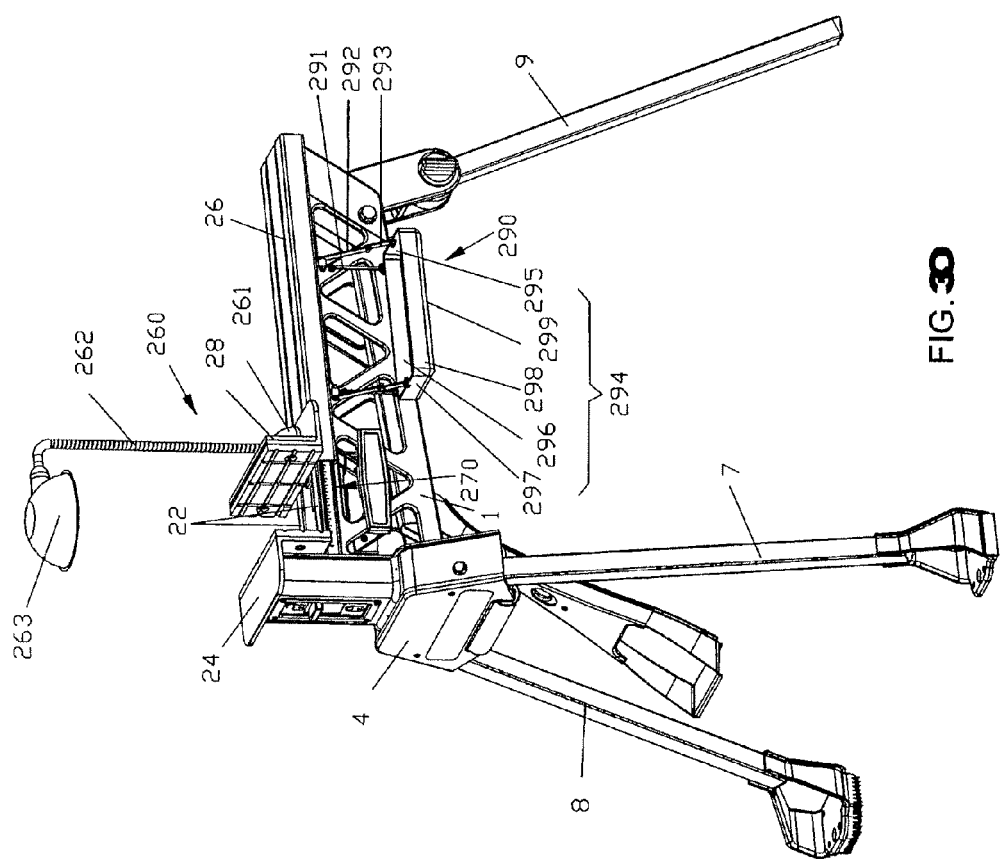
FIG. 30 is a perspective view of a seventh embodiment of the clamping device of the present invention with a lighting device, scale indication unit and tool box.

The clamping device in a seventh embodiment comprises a lighting device 260 to assist use in the evening or in a dark environment. As shown in FIG. 30, the lighting device consists of a lamp holder 261 attached to the movable jaw 28, a flexible tube 262 connected to the lamp holder 261, a lamp (not shown) and a lamp-chimney 263 connected to the flexible tube 262. The flexible tube 262 is adjustable to any desired position. The lighting device 260 is attachable to other components of the clamping device. The power source may have an external power source or dry batteries.

As shown in FIG. 30, a scale indication device 270 is attached to the sliding track 22 to indicate the gap between the fixed jaw 24 and movable jaw 28. The user accurately and easily obtains the width of the workpiece. Likewise as shown in FIG. 31, a scale 272 is attached to the fixed jaw 24 for easy use.

Figure 31:
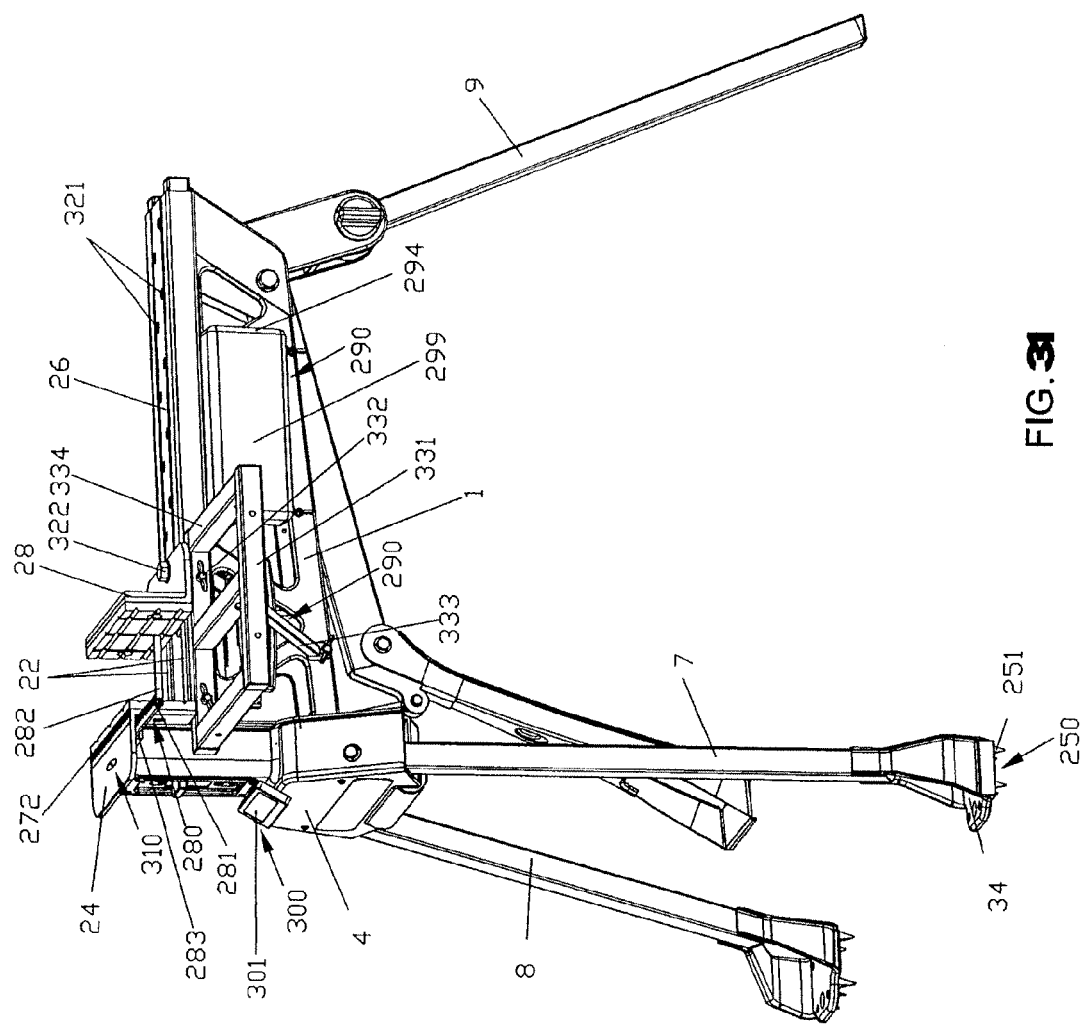
FIG. 31 is a perspective view of an eighth embodiment of the clamping device of the present invention with an auxiliary table.
Figure 32:
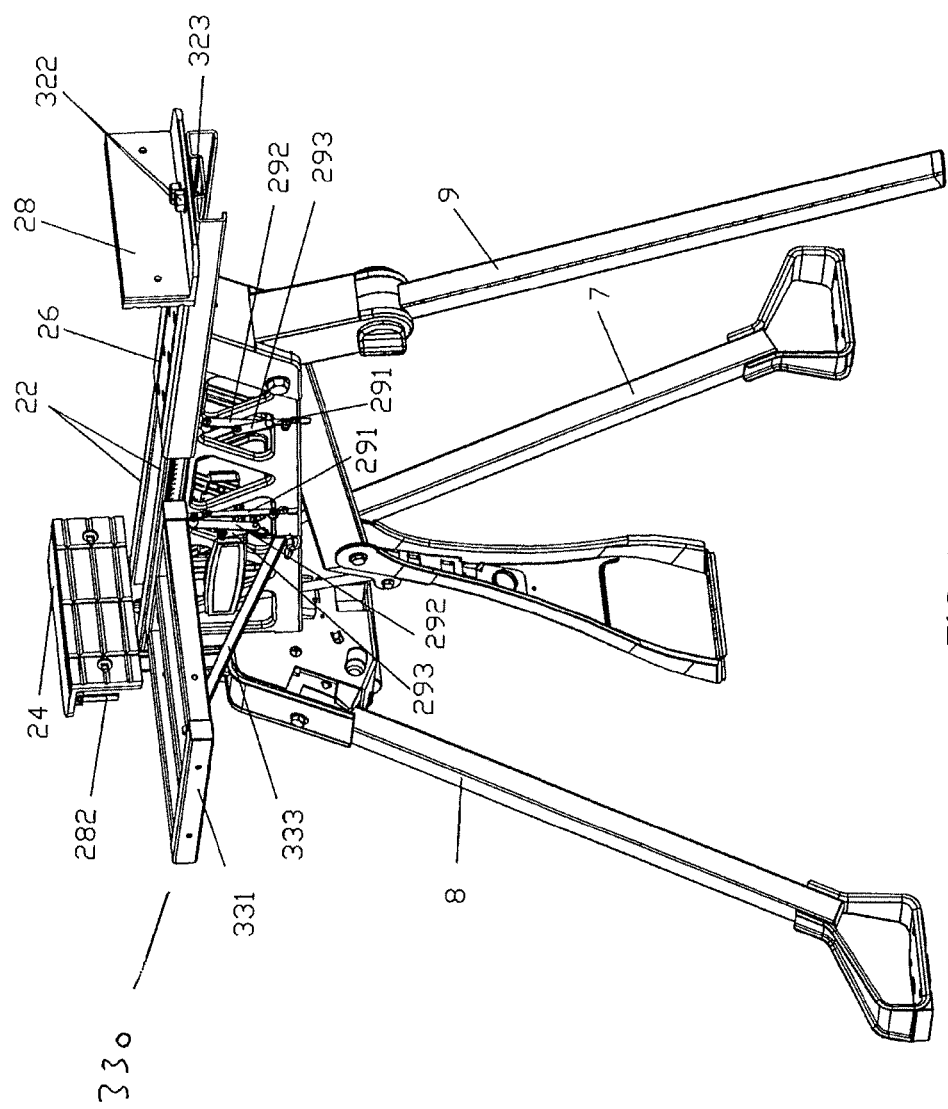
FIG. 32 is a perspective view of the clamping device of FIG. 31 with the movable jaw movably mounted on the sliding track.

As shown in FIG. 31, the clamping device in this embodiment further comprises an auxiliary gauge device 280 for convenient operation. The auxiliary gauge device 280 comprises a gauge 281 and a stopper member 282 attached to one end of the gauge 281. The gauge 281 is slidably attached to an elongate slot 283 formed in the fixed jaw 24 and the stopper member 282 is pivotally mounted on the end of the gauge 281. As shown in FIG. 31, the gauge 281 is withdrawn from the elongate slot 283 when required and the stopper member 282 is rotated to contact the workpiece for easy operation. As shown in FIG. 32, the gauge 281 is inserted in the elongate slot 283 and the stopper member 282 is pivoted downwardly to be stored when in not use.

A tool box 290 for tools (such as a screwdriver or pencil) is attached to the support structure 1. As shown in FIG. 30, the tool box 290 comprises two first support rods 291 fixed to the support structure 1, two second support rods 292 pivotally mounted on the support structure 1, two third support rods 293 pivotally mounted on the two second support rods 292 and an open box 294 with no lid supported by the first support rods 291 and the third support rods 293. The box 294 comprises a first, second, third and fourth side 295, 296, 297, 298 and a foot plate 299.

Each of the first support rods 291 has a first end which is fixed to the support structure 1 and a second end which is pivotally mounted on the box 294. The two ends of the third support rods 293 are respectively pivotally mounted on the second support rods 292 and the box 294. Thus the box 294 has two positions. In the first position (see FIG. 30), the foot plate 299 is arranged in the horizontal direction for the user to add or remove a tool. In the second position shown in FIGS. 31 and 32 (without the box 294 showing the position of each support rod when stored), the box 294 is pivotal around the second end of first support rod 291, whilst the second support rods 292 are pivotal with respect to the support structure 1 and the third support rods 293 are pivotal with respect to the second support rods 292. Thus the box 294 is arranged in the vertical direction to be stored when in not use. This allows the clamping device to be compact and reduce costs, whilst avoiding the troublesome removal of the tool box 290.

Figure 33:
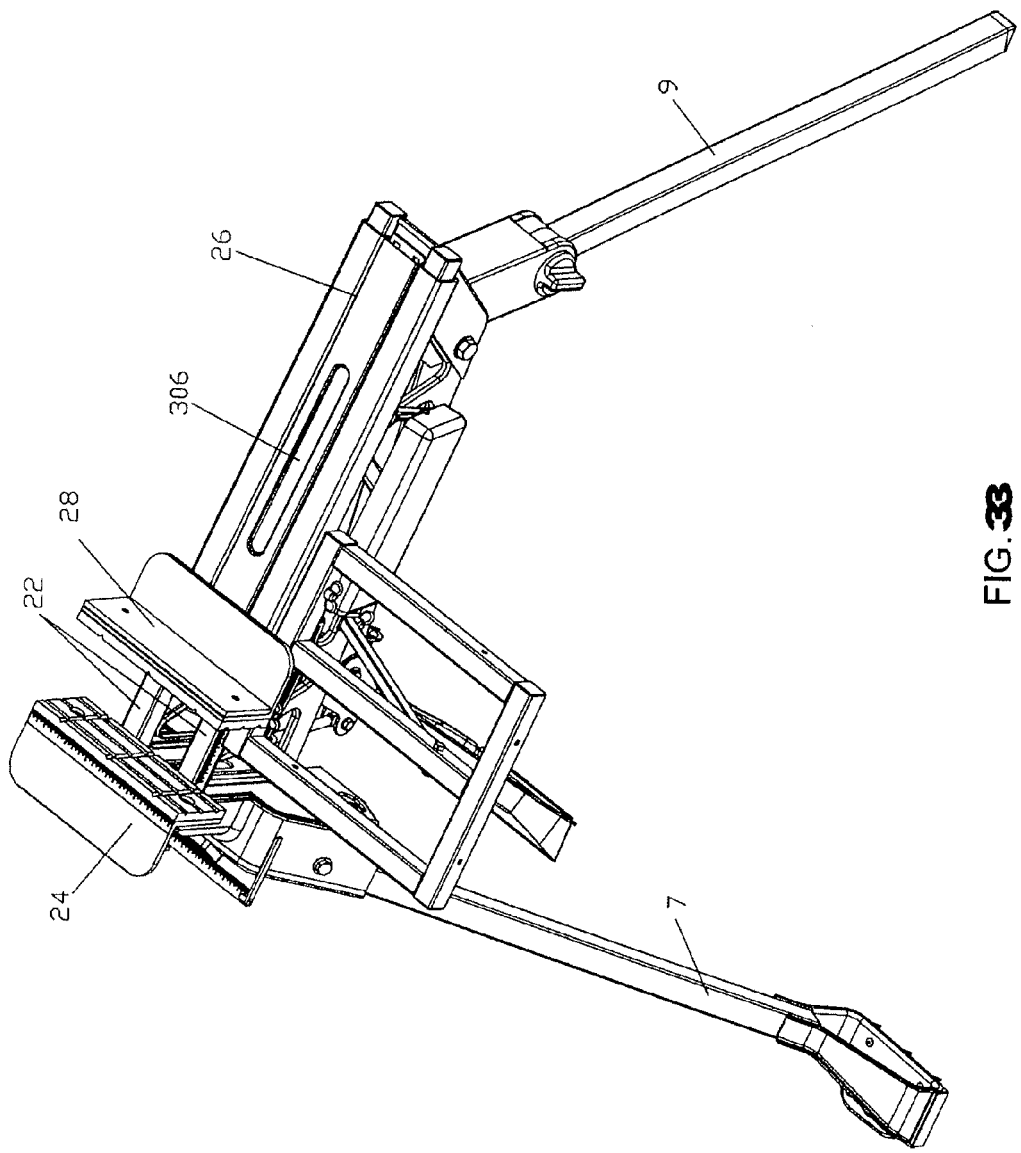
FIG. 33 is a perspective view of the clamping device of the present invention with a tool box which is a groove in sliding track for receiving tool.

As shown in the embodiment of FIG. 33, the sliding track 26 is equipped with a quadrate groove 306 for receiving a pencil, a tape or a small tool. Alternatively there may be twin length grooves or square grooves.

The movable jaw 28 is movably attached to the sliding track 26 to permit a very broad range of jaw openings to be achieved. The user need only adjust the movable jaw 28 relative to the sliding track 26 and does not need to remove and reverse the sliding track 26 (shown in broken outline in FIG. 2). At least one of the fixed track 22 and sliding track 26 is equipped with a restriction device to prevent the sliding track 26 easily sliding out.

As shown in FIG. 31 and FIG. 32, the sliding track 26 has two lines of equally spaced apart threaded holes 321. Nuts 323 are respectively attached to each of the threaded holes (only one is shown in FIG. 32). Two bolts 322 pass through the holes of the movable jaw 28 and the threaded holes 321 to engage the nuts 323. Thus the user can adjust the position of the movable jaw 28 relative to the sliding track 26.

The clamping device further comprises a display device 300 to display the clamping force of the fixed jaw 24 and movable jaw 28 and the distance between the two vices. As shown in FIG. 31, the display device 300 includes a display unit 301 disposed on the front board 4. Alternatively the display unit 301 may be encased in the fixed jaw 24. A displacement sensor is mounted on at least one of the fixed track 22 and movable track 26 and a pressure sensor is mounted on at least one of the fixed track 22 and movable track 26.

The displacement sensor is arranged to detect the distance between the fixed vice 2 and movable vice 28 and a processing unit is connected to the sensor to produce information according to the signal generated by the sensor. The display unit 301 displays the information produced by the processing unit. The pressure sensor is arranged to detect the clamping force of the two vices and a processing unit is connected to the sensor to produce information according to the signal generated by the sensor. The display unit 301 displays the information produced by the processing unit.

The clamping device further comprises a level 310 horizontally attached to the fixed vice 22 (see FIG. 31).

The clamping device in an eighth embodiment comprises an auxiliary table 330 attached to the fixed track 22 to extend the workpiece support surface (see FIG. 31). The auxiliary table 330 is a framework with five support rods 331. The auxiliary table 330 is mounted to the fixed track 22 by a pair of bolts 332. A support surface 334 formed by the five support rods 331 and the support surface of the fixed track 22 define a plane to support the workpieces. A connecting rod 333 connected to the auxiliary table 330 is obliquely attached to the support structure 1 to promote rigidity of the auxiliary table 330. In use, the auxiliary table 330 is attached to the fixed track 22. When not in use, the auxiliary table 330 is detached from the fixed track 22 by loosening the bolts 330.

The auxiliary table and connecting device may be designed to a variety of configurations. For example, the auxiliary table may be rotatably or telescopically attached to the support structure 1.

These and other modifications of the preferred embodiments as well as other embodiments of the invention will be suggested to those skilled in the art from the disclosure herein, whereby it is to be distinctly understood that the foregoing descriptive matter is to be interpreted merely as illustrative of the invention and not as a limitation.

The invention claimed is:
1. A clamping device comprising:
a fixed jaw;
an elongate support structure having a proximal end and a distal end, wherein the elongate support structure carries the fixed jaw at or near to its proximal end;
a surface-bearing foldable frame attached to and supporting the elongate support structure;
an elongate fixed track having a proximal end and a distal end, wherein the elongate fixed track is immovably mounted on the support structure;
a movable jaw;
a sliding track movably mounted on the fixed track, wherein the sliding track carries the movable jaw;
an advancing clamping mechanism mounted on the support structure for advancing the sliding track along the fixed track towards the fixed jaw in a longitudinal direction; and
a transportation mechanism attached to at least one of the proximal end of the elongate support structure and the fixed jaw, wherein the transportation mechanism is configured to facilitate surface-bearing transportation of the clamping device, wherein the transportation mechanism comprises a rotatable shaft mounted on the proximal end of the elongate support structure and a wheel mounted on the rotatable shaft, wherein the rotatable shaft is substantially perpendicular to the longitudinal direction of the sliding track, wherein the foldable frame includes a first leg pivotally mounted on the proximal end of the elongate support structure about a first axis, a second leg pivotally mounted on the proximal end of the elongate support structure about a second axis and a third leg pivotally mounted on the distal end of the elongate support structure about a third axis and wherein the foldable frame has a first, second and third position, wherein in the first position, the first, second and third legs together support the elongate support structure and wherein in the second position, the first, second and third legs are folded for storage and wherein in the third position when the transportation mechanism engages the surface, the first and second legs are folded for storage and the third leg is folded rearwardly to provide a transportation handle and the elongate support structure is inclined relative to the surface by lifting the transportation handle.

2. The clamping device of claim 1, wherein a length of the wheel in a transverse direction is greater than the diameter of the wheel.

3. The clamping device of claim 1, wherein the transportation mechanism comprises:
a sliding member disposed at the proximal end of the elongate support structure.

4. The clamping device of claim 1, wherein the first and second legs are capable of pivoting inwardly of the elongate support structure and the third leg is capable of pivoting inwardly or outwardly of the elongate support structure.

5. The clamping device of claim 1, wherein the clamping device further comprises:
a detent locking mechanism disposed between one of the first leg or the second leg and the elongate support structure, wherein the detent locking mechanism includes:
a detent member pivotally mounted on the elongate support structure,
a spring located between the detent member and the elongate support structure, wherein the detent member provides a first abutment member which in a non-folded position is engaged with the leg and a second abutment member which in a folded position is engaged with the leg.

6. The clamping device of claim 5, wherein the clamping device further comprises:
a retaining mechanism disposed between the third leg and the support structure, wherein the retaining mechanism includes
a screw extending through the third leg and the elongate support structure; and
a nut engaged with the screw.

7. The clamping device of claim 1, wherein the advancing clamping mechanism includes:
a lever pivotally mounted at its distal end on the elongate support structure; a foot pedal pivotally mounted on the proximal end of the lever;
an elongate advancing member with pawls pivotally mounted on the distal end of the lever;
an oriented arm slidably connected to the support structure;
a spring disposed between the advancing member and the oriented arm; and a plurality of apertures in the sliding track engageable with the pawls.

8. A clamping device comprising:
a fixed jaw;
an elongate support structure having a proximal end and a distal end, wherein the elongate support structure carries the fixed jaw at or near to its proximal end;
a surface-bearing foldable frame attached to and supporting the elongate support structure;
an elongate fixed track having a proximal end and a distal end, wherein the elongate fixed track is immovably mounted on the support structure;
a movable jaw;
a sliding track movably mounted on the fixed track, wherein the sliding track carries the movable jaw;
an advancing clamping mechanism mounted on the support structure for advancing the sliding track along the fixed track towards the fixed jaw in a longitudinal direction; and
a transportation mechanism configured to facilitate surface-bearing transportation of the clamping device, the transportation mechanism including a rotatable shaft, a wheel mounted on the rotatable shaft, wherein said rotatable shaft is substantially perpendicular to the sliding direction of said sliding track.

* * * * *